United States Patent
Vazirani et al.

(10) Patent No.: US 12,385,937 B2
(45) Date of Patent: Aug. 12, 2025

(54) VEHICLE FOR TRANSPORTING A BIOLOGICAL SAMPLE, COMPRISING A GUIDE DEVICE

(71) Applicant: ERBA DIAGNOSTICS LIMITED, Dublin (IE)

(72) Inventors: Nikhil Vazirani, Mumbai Maharashtra (IN); Jeanet Randrianarivo, Saint-Martin-de-Londres (FR); Valentin Ghoris, Montpellier (FR); Sylvain Andlauer, Le Cres (FR)

(73) Assignee: ERBA DIAGNOSTICS LIMITED, Leopardstown (IE)

( * ) Notice: Subject to any disclaimer, the term of this patent is extended or adjusted under 35 U.S.C. 154(b) by 827 days.

(21) Appl. No.: 17/624,399

(22) PCT Filed: Jul. 8, 2020

(86) PCT No.: PCT/EP2020/069180
§ 371 (c)(1),
(2) Date: Jan. 3, 2022

(87) PCT Pub. No.: WO2021/005085
PCT Pub. Date: Jan. 14, 2021

(65) Prior Publication Data
US 2022/0357353 A1    Nov. 10, 2022

(30) Foreign Application Priority Data
Jul. 8, 2019   (FR) ...................................... 1907575

(51) Int. Cl.
*G01N 35/04*   (2006.01)
*B60L 9/02*    (2006.01)
(Continued)

(52) U.S. Cl.
CPC ................ *G01N 35/04* (2013.01); *B60L 9/02* (2013.01); *B60L 13/003* (2013.01); *B65G 54/02* (2013.01);
(Continued)

(58) Field of Classification Search
CPC .......... B60L 13/003; B60L 5/39; B60L 50/40; B60L 9/02; B60L 9/04; B65G 54/02;
(Continued)

(56) References Cited

U.S. PATENT DOCUMENTS

| | | | |
|---|---|---|---|
| 2006/0113429 A1* | 6/2006 | Arnau Manresa | A63H 18/16 246/415 A |
| 2018/0162393 A1* | 6/2018 | Lee | B60T 8/17558 |
| 2020/0166534 A1* | 5/2020 | Rousseau | G01N 33/487 |

FOREIGN PATENT DOCUMENTS

| | | |
|---|---|---|
| CN | 1982175 A | 6/2007 |
| DE | 2533799 A1 | 2/1977 |

(Continued)

OTHER PUBLICATIONS

English Translation for JP 2002-284339A (Year: 2024).*
(Continued)

*Primary Examiner* — Jennifer Wecker
*Assistant Examiner* — Jonathan Bortoli
(74) *Attorney, Agent, or Firm* — Thomas | Horstemeyer, LLP

(57) ABSTRACT

The invention relates to a vehicle for transporting a biological sample, the vehicle being movable on a circuit, the circuit comprising: —an input path, a first output path and a second output path, —a turn-off enabling the vehicle travelling on the input path to be redirected to the first output path or the second output path, —a first guide path extending along the input path, the turn-off and the first output path, —a guide device which can be configured in: —a first
(Continued)

configuration in which the guide device cooperates with the first guide path so as to direct the vehicle to the first output path when the vehicle passes through the turn-off, —a second configuration in which the guide device does not cooperate with the first guide path, enabling the vehicle to reach the second output path.

22 Claims, 13 Drawing Sheets

(51) Int. Cl.
    *B60L 13/00*     (2006.01)
    *B65G 54/02*     (2006.01)

(52) U.S. Cl.
    CPC ............... *G01N 2035/0406* (2013.01); *G01N 2035/0472* (2013.01); *G01N 2035/0491* (2013.01)

(58) Field of Classification Search
    CPC ... G01N 2035/0406; G01N 2035/0472; G01N 2035/0489; G01N 2035/0491; G01N 35/04; Y02T 10/70; G02F 1/133; G06F 11/3013; G06F 11/3055; G06F 11/3093; G06F 11/324; G06F 2201/86; G06F 2201/875; H04L 41/06

See application file for complete search history.

(56) References Cited

FOREIGN PATENT DOCUMENTS

| | | |
|---|---|---|
| EP | 2629099 A1 | 8/2013 |
| JP | 2002284339 A | * 10/2002 |

OTHER PUBLICATIONS

JPH06144506A Shigeru (Year: 1992).*
JP2001278409 Matsumoto (Year: 2001).*
EP-2064076-A2 Couto D (Year: 2009).*
PCT Search Report in co-pending, related PCT Application No. PCT/EP2020/069180, mailedMar. 11, 2020.
French Search Report in co-pending, related French Application No. FR1907575, mailed Apr. 29, 2020.

* cited by examiner

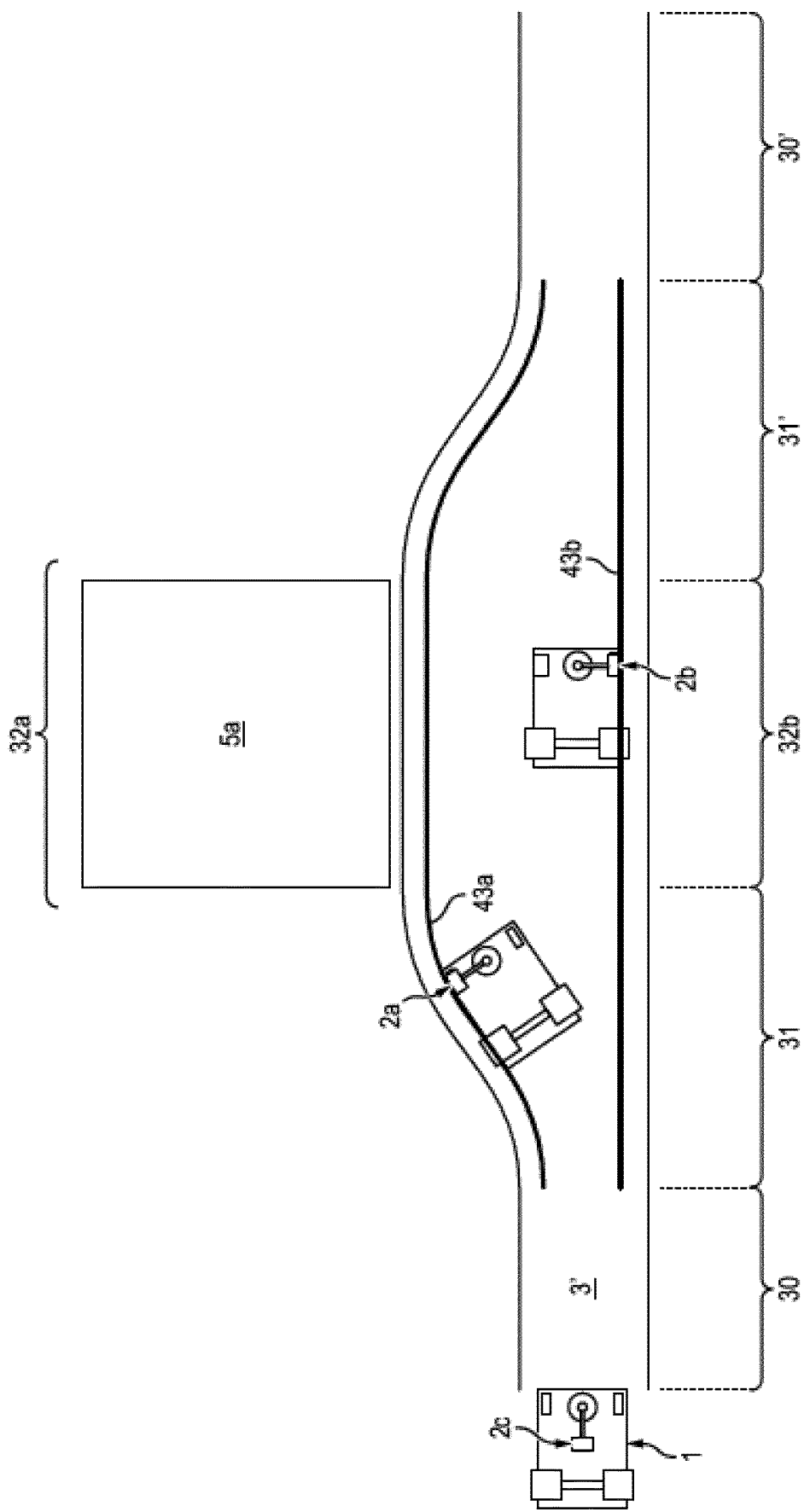

VEHICLE FOR TRANSPORTING A BIOLOGICAL SAMPLE, COMPRISING A GUIDE DEVICE

CROSS REFERENCE TO RELATED APPLICATIONS

This application is the 35 U.S.C. § 371 national stage application of PCT Application No. PCT/EP2020/069180, filed Jul. 8, 2020, which application claims the benefit of French Application No. FR 1907575, filed Jul. 8, 2019, both of which are hereby incorporated by reference herein in their entireties.

FIELD OF THE INVENTION

The invention relates to the automated transport of objects, in particular the transport of body fluid samples for further analysis by automated medical diagnosis machines. Applications exist in all areas of biological diagnosis in laboratories or in hospitals.

The invention particularly relates to a movable transport vehicle on a circuit, to a transport assembly comprising said vehicle and said circuit, and to an analysis assembly.

STATE OF THE ART

The processing and the analysis of body fluid samples, such as blood or urine samples, are largely automated. A physiological measurement is carried out on the samples. The samples are poured into containers, such as tubes, moved along an analysis pathway in order to be analyzed.

In the majority of known sample transport systems, the sample tubes are transported either in bulk or in a grouped manner in racks, for example rectangular racks of ten tubes. Each rack is handled separately by pushers, conveyor plates, etc. In known systems, the racks are organized in a line and processed sequentially. Once in the vicinity of an automated diagnosis machine, the tubes of the rack are individually handled by a handling unit integrated into the automated diagnosis machine, in order to be analyzed.

However, the grouped transport of tube racks has several drawbacks. If the tubes are processed sequentially (in their order of arrival to the automated diagnosis machine), the presence of empty tubes slows down the analysis rate, typically measured in number of samples analyzed per hour. This solution imposes a sequential analysis order depending on the order in which the racks are introduced.

In addition, there is a wide variety of possible tests; for example, a biological serum-like sample is not analyzed in the same way as a urine sample. The stirring, centrifugation times, etc. differ. In the case of sequential tube processing, the automated diagnosis machine with the lowest analysis rate imposes its rhythm on the other automated diagnosis machines. The only way to force the priority analysis of a particular sample is to proceed to a manual insertion of said sample in a manual insertion area of the automated machine, which is unsatisfactory.

It has been proposed to transport the sample tubes individually. One advantage is to allow each tube to have an independent trajectory. Thus, the empty tubes or the tubes with long analysis time do not slow down the analysis of the other tubes.

Known systems comprise an electronically controlled conveyor belt which transports tube holders put in line. The tube holders are passive; the displacement of the tubes is entirely managed by the belt. This solution is unsatisfactory in terms of failure management; if the conveyor belt breaks down, the entire tube transport loop is interrupted. In addition, several independent belts must be provided to allow a selection between several divergent trajectories.

There are also tube holder vehicles including motorized wheels and an individual tube holder on the top of the vehicle.

Some known vehicles are completely autonomous in their displacement. A monitoring unit is embedded in each vehicle and a computer program of the monitoring unit determines the trajectory of the vehicle. The wheels of the vehicle are controlled by the monitoring unit.

However, the cost of manufacturing and holding such vehicles is very high, since the vehicle embeds all the intelligence necessary to determine the trajectory. The use of this type of vehicle introduces additional complexity for the monitoring of the position of each vehicle of the circuit within the laboratory. Many special cases must be managed by the monitoring unit of each vehicle, with very significant risks of collisions and overall blocking of the circuit.

Other known vehicles are forced to change direction by a change in the configuration of "active" transport pathways. An active transport pathway comprises electronically controlled movable elements, such as points mounted at intersections with other transport pathways.

Depending on the position of said movable elements, the vehicle passing over the intersection adopts several distinct trajectories. For example, the vehicle takes a first or a second direction. In the case of a point, the vehicle is pointed without changing the orientation of the vehicle's wheels.

Patent application US 2015/014125 A1 describes a transport track comprising a point illustrated in FIG. 3 at an intersection. Patent application US 2005/271555 A1 describes a vehicle which does not comprise embedded direction change means, said vehicle operating with an active transport pathway whose walls illustrated in FIGS. 3 and 4 can adopt an unfolded position or a folded position. The configuration of the walls imposes the trajectory of the vehicle.

However, the systems with active transport pathways have several drawbacks. The architecture of these systems is complex and there is a risk of damage if the synchronizations are not guaranteed, when the pathway changes configuration at the time of passage of the vehicle. In addition, the management of the failures is difficult. A failure at an intersection of the transport pathway can block the entire circuit. It is therefore necessary to replace or repair very quickly the faulty equipment of the intersection, otherwise the tube analysis operations are suspended. Finally, each change of direction in the intersection causes rapid wear over the tube holder vehicle passages therethrough.

GENERAL DESCRIPTION OF THE INVENTION

There is a need for a body fluid sample transport system whose wear is limited, in which an equipment failure allowing the change of direction has less impact on the overall operation of the circuit.

There is also a need for a sample transport system which is modular, architecturally simple enough to accommodate many types of tests and to be shortened or lengthened as needed.

There is also a need for a sample transport and analysis system in which the analysis rate is optimized for all samples, despite the presence of a large proportion of empty sample containers or despite the presence of different types of samples.

The invention meets these needs by providing, according to a first aspect, a vehicle for transporting a biological sample, movable on a circuit, the circuit comprising:
- an entry pathway, a first exit pathway and a second exit pathway,
- a fork allowing the vehicle circulating on the entry pathway to be redirected to the first exit pathway or to the second exit pathway,
- a first guide path extending alongside the entry pathway, the fork and the first exit pathway,
- the vehicle further comprising a guide device configurable in:
  - a first configuration in which the guide device cooperates with the first guide path so as to direct the vehicle towards the first exit pathway when the vehicle crosses the fork,
  - a second configuration in which the guide device does not cooperate with the first guide path when the vehicle crosses the fork, allowing the vehicle to reach the second exit pathway.

A vehicle according to the invention comprises a guide device adapted to force the vehicle to change direction at a fork in the circuit. The change of direction is made by cooperation between the guide device present on the vehicle and the guiding path present on the pathway. According to possible variants, the cooperation between the guide device and the pathway is mechanical or magnetic.

A transport assembly including a vehicle according to the invention allows better failure management than a transport assembly including vehicles operating with active transport pathways comprising electronically controllable movable elements.

The transport pathways of the circuit do not necessarily comprise movable elements such as points. It is therefore easier to modify the architecture of the transport pathways over time, as needed. The thus obtained transport circuit therefore has greater modularity than the known circuits.

The sample transport vehicle of the invention includes optionally and without limitation the following additional characteristics, taken alone or in any one of the technically possible combinations:
- the circuit further comprises a second guide path which extends alongside the entry pathway, the fork and the second exit pathway, the guide device in the second configuration cooperating with the second guide path so as to direct the vehicle towards the second exit pathway when the vehicle crosses the fork.
- the first guide path comprises an edge, in which the guide device comprises a rod and a solenoid adapted to move the rod, the rod being arranged to abut against the edge when the guide device is in the first configuration, the edge preferably comprising a shoulder or a cavity edge, so as to retain the vehicle in the vicinity of the first guide path.
- the vehicle includes a lower face and the guide device comprises a low abutment element, the low abutment element being movable towards a position where it protrudes from the lower face, the low abutment element being configured to be engaged in a groove of the first guide path when the guide device is in the first configuration, so as to retain the vehicle in the vicinity of the first guide path.
- the vehicle further comprises wheels and a motor configured to drive in rotation the wheels selectively forward or backward, the motor being preferably a DC motor or a brushless motor.
- the vehicle further comprises an autonomous energy reserve, preferably an accumulator or a supercapacitor.
- the guide device comprises a movable magnet between:
  - a first location where the magnet cooperates with the first guide path so as to attract the vehicle towards the first guide path,
  - a second location where the magnet does not cooperate with the guide path sufficiently to attract the vehicle towards the first guide path.
- the vehicle comprises a frame and the guide device comprises an arm pivotally mounted on the frame, the magnet being fixed to the arm.
- the vehicle further comprises a guide able to adopt a configuration in which the guide forms an elastic connection between the vehicle and a second guide path which extends alongside the entry pathway, the fork and the second exit pathway, the guide being of preferably a spring.
- the vehicle further comprises a control unit configured to control a change in the configuration of the guide device from one of the first and second configurations towards the other configuration.
- the vehicle comprises at least one sliding electrical contact for supplying the vehicle with electric current, the electrical contact being arranged to be in contact with the circuit when the vehicle is circulating on the circuit.
- the vehicle further comprises a vehicle sensor configured to detect another vehicle in the vicinity.
- the vehicle further comprises a radiofrequency chip, preferably an RFID chip, configured to emit a signal comprising an identifier of the vehicle.

The invention relates, according to a second aspect, to a sample transport assembly comprising a sample transport vehicle as defined above, an entry pathway, a first exit pathway, a second exit pathway, a fork forming an intersection between the entry pathway, the first exit pathway and the second exit pathway,
and a first guide path extending alongside the entry pathway, the fork and the first exit pathway.

Optionally and without limitation, the transport assembly can have the following characteristics taken alone or in combination:
- the vehicle comprises wheels and the entry pathway and/or the first exit pathway comprise a low surface intended to be in contact with the wheels and further comprise two side walls parallel to each other and extending from the low surface, the first guide path being arranged along one of said side walls, the first guide path preferably comprising a shoulder or a cavity edge against which the vehicle guide device is able to come into abutment.
- the side walls each comprise a shoulder and the shoulders are movable between a vehicle holding position and a vehicle release position in which said shoulders are configured so as not to hold the vehicle in position when it is located between the shoulders, so as to authorize a withdrawal of the vehicle from the circuit.
- the circuit comprises the first exit pathway, the second exit pathway and a third exit pathway, the third exit pathway extending between the first exit pathway and the second exit pathway, the fork forming an intersection between the entry pathway and the first, second and third exit pathways.
- the circuit comprises a supply track arranged to cooperate with the electrical contact of the vehicle.
- the circuit comprises at least one vehicle passage detector, the passage detector being preferably configured to receive a vehicle identifier, the passage detector being preferably a radiofrequency transceiver configured to activate a radiofrequency chip of the vehicle.

According to a third aspect, the invention relates to a sample analysis assembly, in particular body fluid samples, the assembly comprising a sample transport assembly as defined above, as well as a sample analysis unit, arranged such that a sample container placed on the vehicle of the transport assembly has access to an analysis area of the analysis unit, and a monitoring unit configured to emit a direction change signal received by the vehicle from the transport assembly.

Optionally and without limitation, in such a sample analysis assembly, the sample analysis unit may be located in the vicinity of the first guide path, so that the vehicle, when crossing the fork, is directed towards the sample analysis unit if the guide device is in the first configuration.

GENERAL DESCRIPTION OF THE FIGURES

Other characteristics, aims and advantages of the invention will emerge from the following description which is purely illustrative and not limiting, and which should be read in relation to the appended drawings, among which:

FIG. 5 is a close-up schematic view of a power supply track of the transport pathway;

Figure 3:
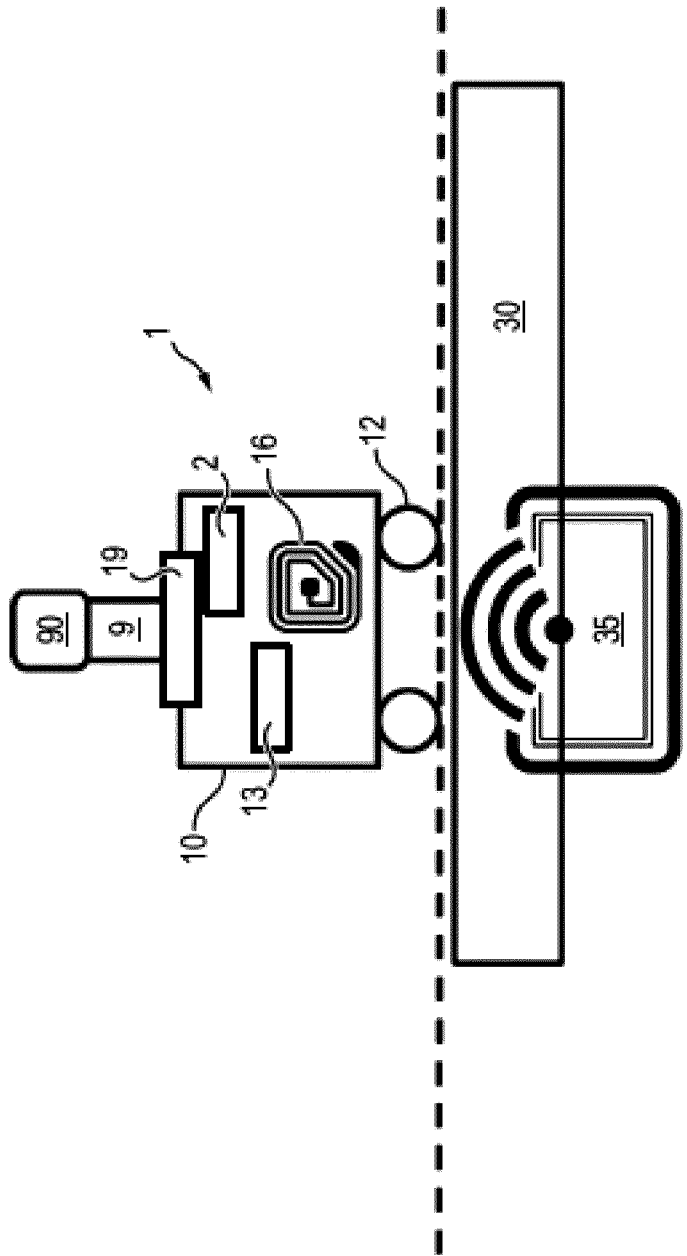
FIG. 3 represents a tube holder vehicle according to a first embodiment, seen from the rear side.
Figure 5:
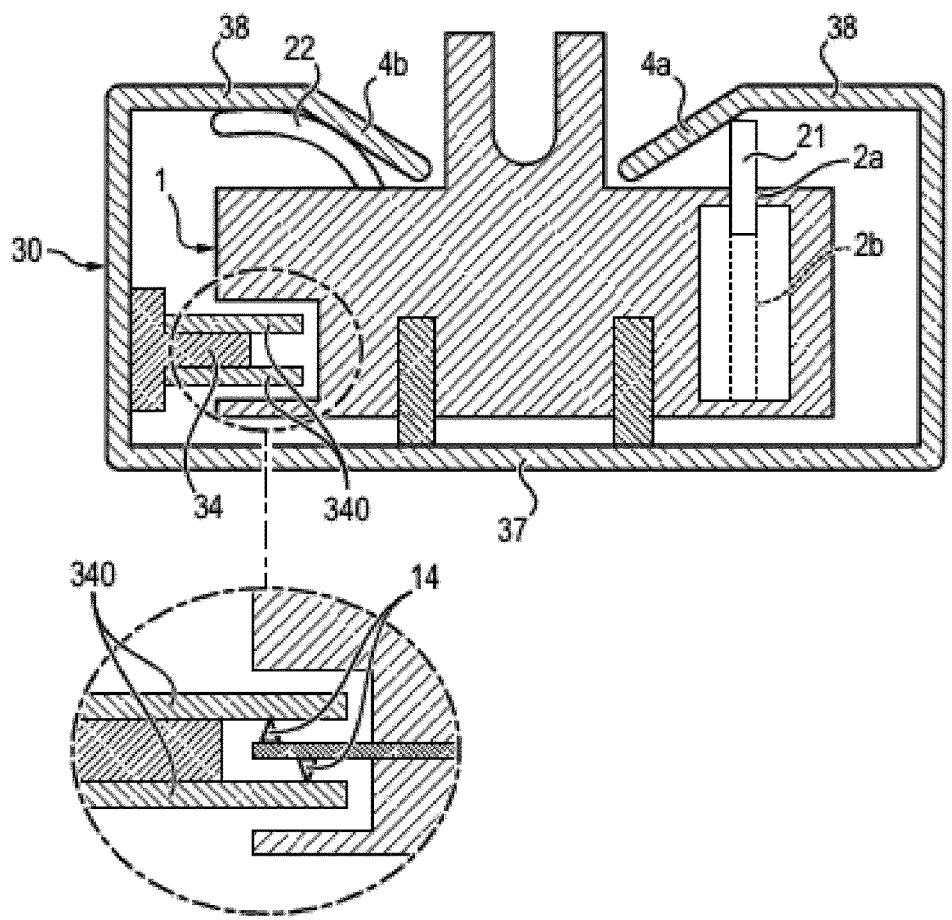
FIG. 5 represents the vehicle of FIG. 4 seen from the back, during displacement on a transport pathway. The low portion of this
Figure 7A:
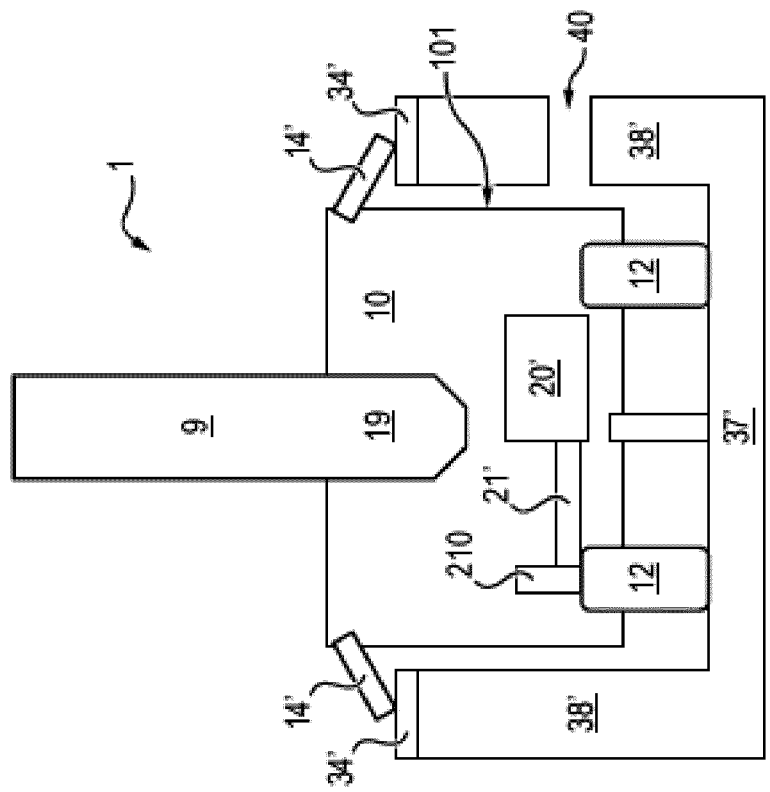
Figure 7B:
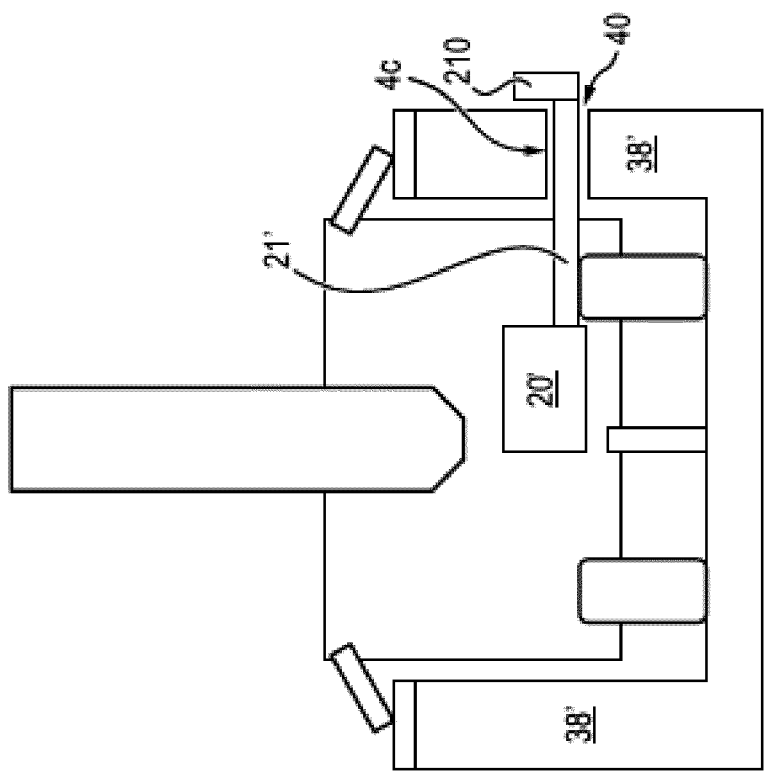
Figure 8:
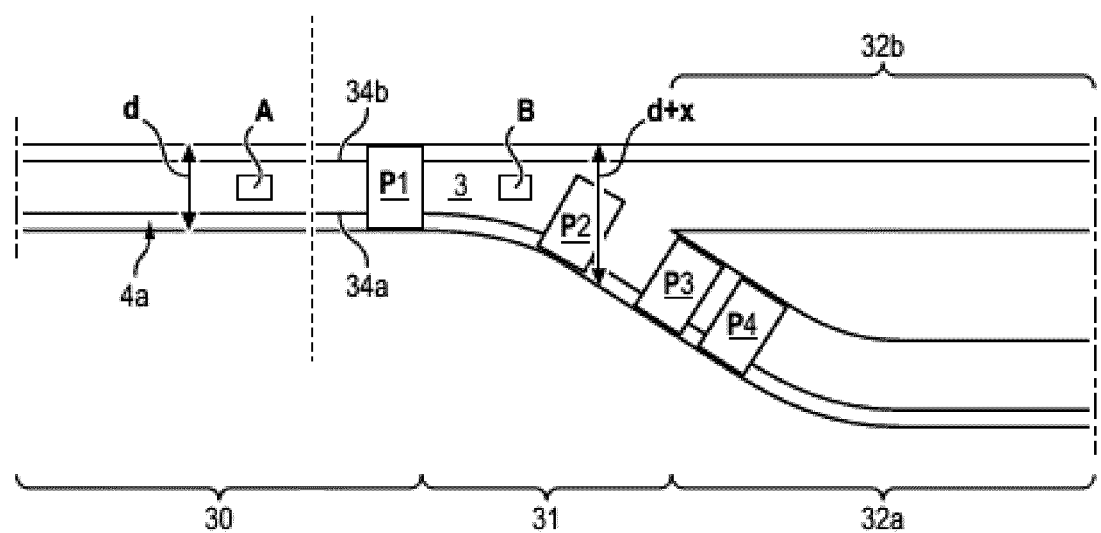
Figure 9A:
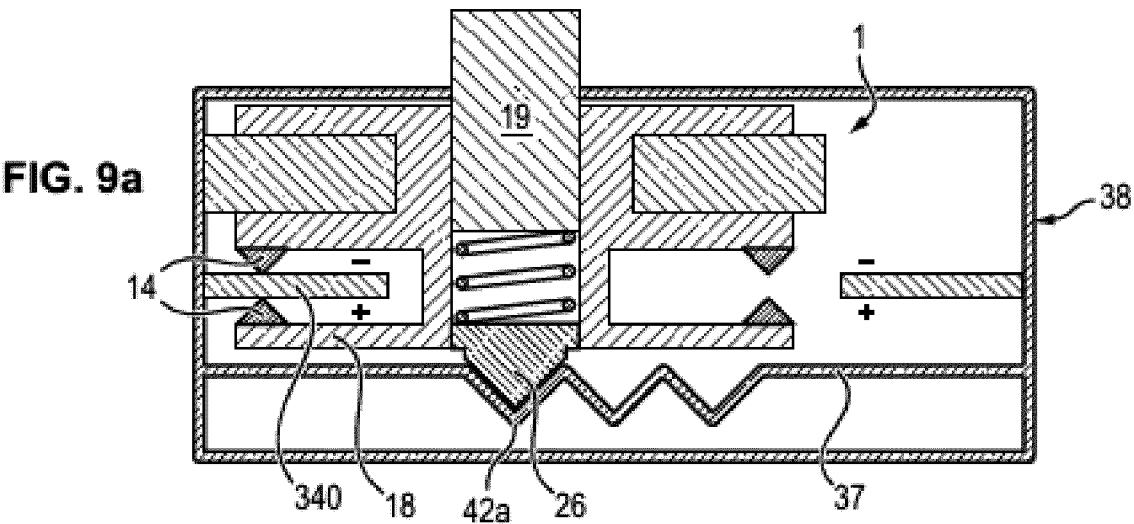
Figure 9B:
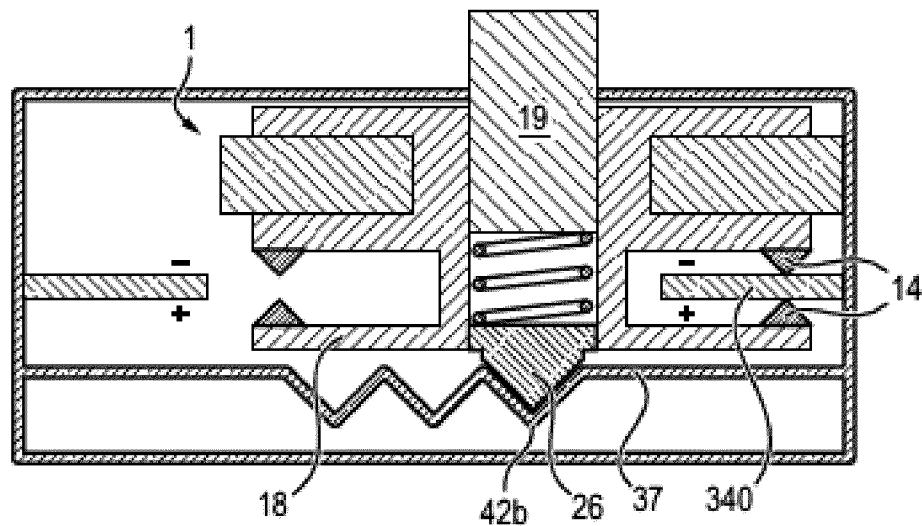
Figure 9C:
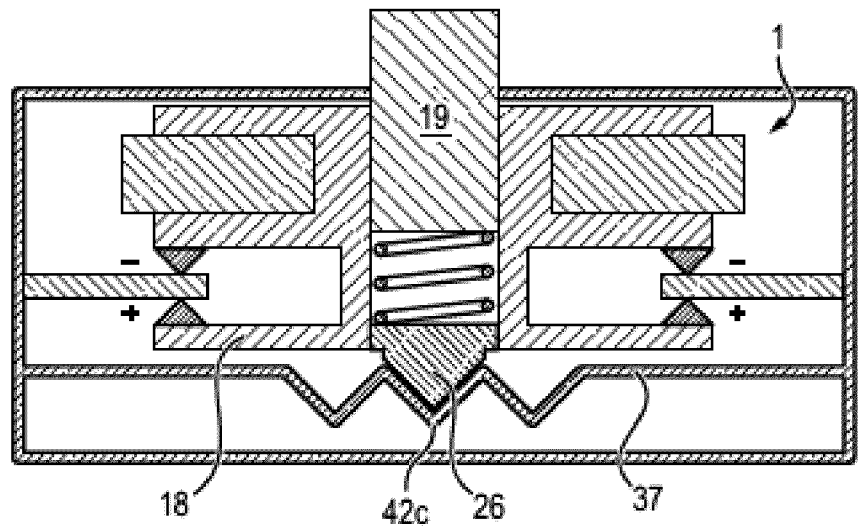
Figure 10:
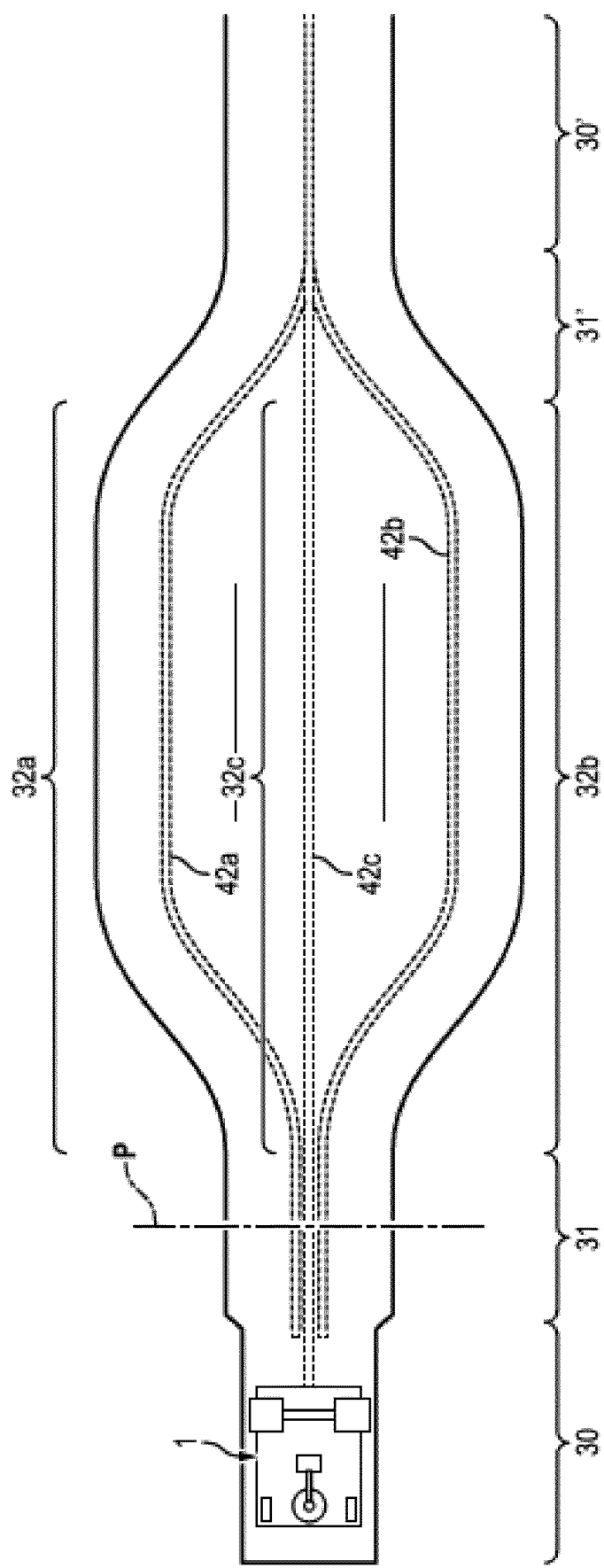
Figure 11:
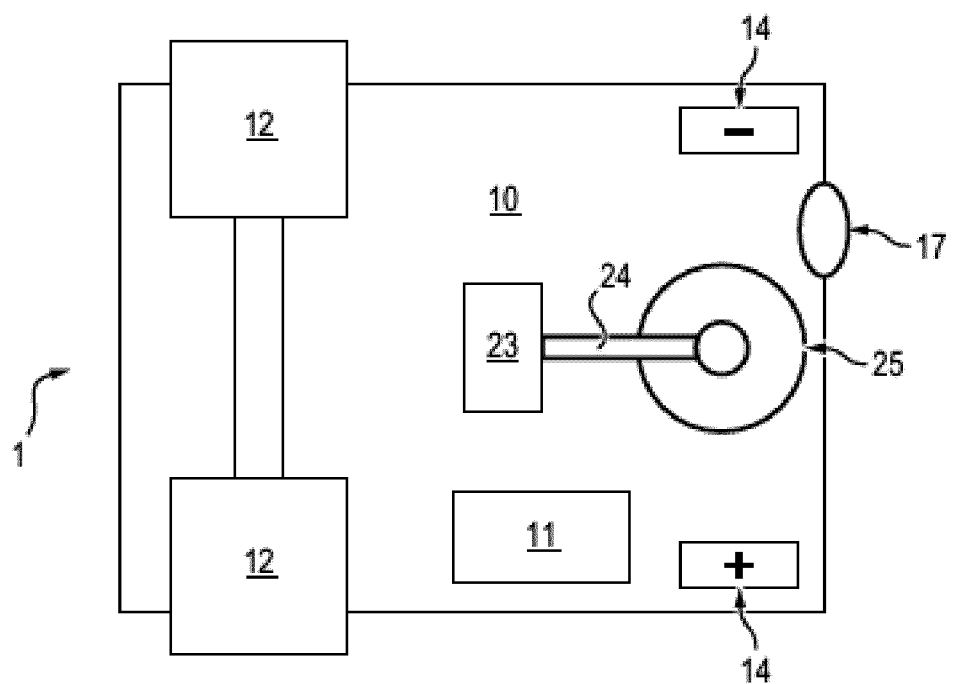

FIGS. 7a, 7b schematically represent a tube holder vehicle according to a second embodiment;

FIG. 8 is a schematic top view of a circuit including the vehicle and the transport pathway of FIG. 5, on which several successive positions of the vehicle of FIG. 3 have been recorded;

FIGS. 9a, 9b, 9c represent a tube holder vehicle according to a third embodiment seen from the back, the vehicle being located at a fork in a transport pathway, the guide device being respectively in a first, a second and a third configuration in these three figures;

FIG. 10 is a schematic top view of a circuit including the vehicle and the transport pathway of FIGS. 9a, 9b and 9c;

FIG. 11 is a schematic top view of a tube holder vehicle according to a fourth embodiment;

FIG. 12 is a schematic top view of a sample analysis assembly which includes the vehicle of FIG. 11, represented here in several successive positions, and which includes a transport circuit according to one variant.

DETAILED DESCRIPTION OF EMBODIMENTS OF THE INVENTION

The detailed description below presents systems for the automated transport of biological samples. By "biological sample" is meant a liquid or solid volume (for example a body fluid, such as blood) on which the automated diagnosis machine is configured to perform one or several tests. By "sample container" is meant a container which allows the individualized transport of a sample taken from an individual.

Throughout the description below, the sample containers are test tubes. It is advantageous to use as a container a tube including a removable cap, to avoid losing or damaging the sample during transport. However, the invention finds an advantageous use for any other type of sample container that can be transported on a vehicle.

Throughout the following and in the appended figures, similar elements are designated with the same alphanumeric references.

Biological Sample Analysis Assembly

Figure 1:
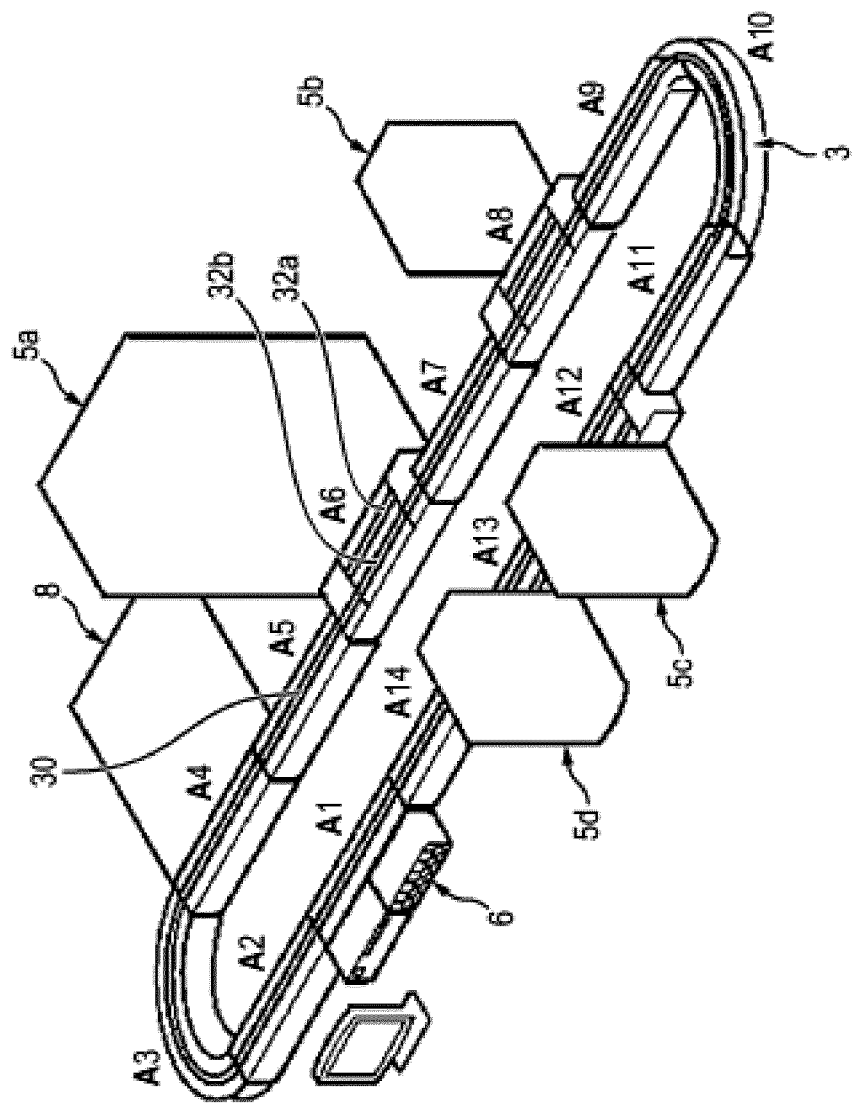
FIG. 1 is a schematic view of a tube analysis assembly including a transport circuit associated with several systems.
Figure 2:
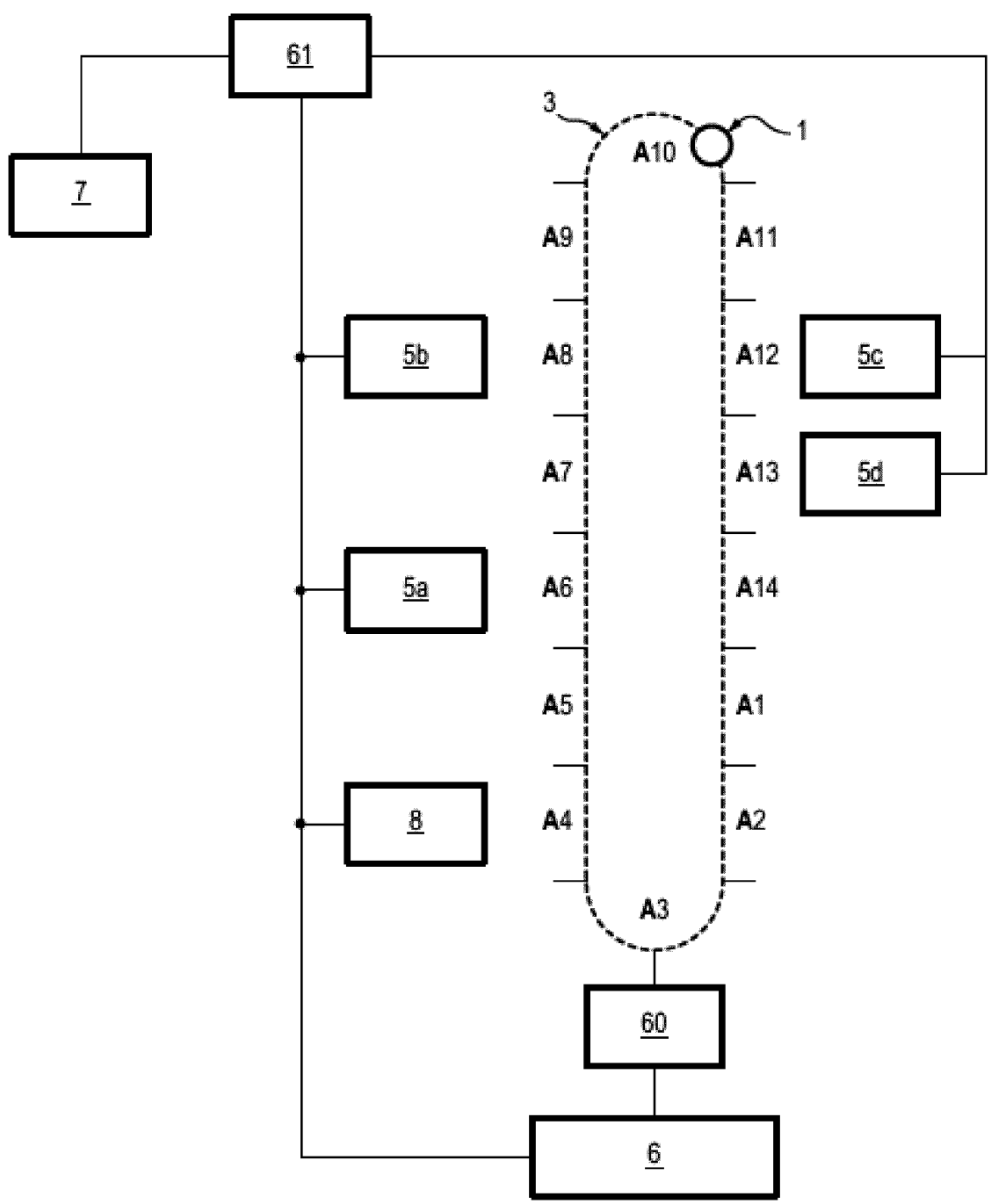
FIG. 2 is a block diagram of the analysis assembly of FIG. 1.

FIGS. 1 and 2 schematically represent a biological sample analysis assembly, which can for example be installed in a medical analysis laboratory. This assembly includes a sample tube transport circuit 3 and a plurality of electronic systems, preferably systems belonging to the field of laboratory instrumentation, positioned on the edges of the circuit 3.

The circuit 3 is composed of a plurality of modules numbered A1 to A14 and placed in series. Each module includes a low surface for contact with a holder, an upper surface on which tube holder vehicles 1 can circulate such as any one of the vehicles described below, and side faces. The modules A3 and A9 are modules performing a 180° turn. The other modules correspond to a straight segment.

FIG. 1 represents for each module a transport pathway extending from one end to the other of the module. In this example, each transport pathway takes the form of a channel made in the upper surface of the module. A vehicle 1 can circulate in the channel. For simplicity, in FIG. 2, the consecutive transport pathways are represented in the form of a single closed dotted curve.

Among the straight-segment modules, some modules (in this example, the modules located in the vicinity of an analysis system among the systems 5a to 5d) comprise two parallel pathways. For example, an entry pathway 30 is referenced in FIG. 1 extending from one end to the other of the module A5 and two parallel exit pathways 32a and 32b which extend along the module A6. The entry pathway is joined to the two exit pathways via a fork (not represented in FIG. 1) at the interface of the modules A5 and A6. The entry pathway and the exit pathways are transport pathways.

As the transport pathways are in extension of each other, a tube holder vehicle positioned on the circuit 3 can reach any one of the modules A1 to A14, depending on its stroke on the transport pathways.

The circuit 3 therefore serves all the systems of the analysis assembly.

One advantage of the circuit 3 is its modularity; it is easy to move the modules of the circuit and to replace them in a new configuration, for example if the locations of the systems served by the circuit 3 are modified. A straight-segment module can be easily replaced by a module making a turn, and vice versa. It is sufficient to place the transport pathways in the extension of each other.

The sample analysis assembly in FIGS. 1 and 2 is therefore scalable. Optionally, when a circuit with a new scheduling of the modules is operated, the monitoring unit 6 performs a scan of the circuit and records a spatial configuration of the modules of the circuit. In the present example, the monitoring unit 6 is connected to the module A3; when the system is powered on, the module A3 turns on first, then the other modules are powered on in cascade one after the other. When the power is turned on, each module transmits a signal received by the monitoring unit 6. Depending on the times of reception of said signals, we go back to the spatial configuration.

Among the systems positioned at the edges of the circuit 3, there are analysis instruments 5a, 5b, 5c, 5d. By way of example, the analysis instrument 5a is an automated diagnosis machine including an individual sample handling unit and including optical and/or chemical means and/or any other analysis means. The functions of the sample handling unit are in particular the handling of a tube towards a sampling position of the automated diagnosis machine.

Advantageously, the automated diagnosis machine 5a does not include a dedicated sample transport unit or autosampler. Indeed, the circuit 3 is sufficient to fulfill the function of transporting samples up to a position where the samples can be analyzed by the automated machine 5a.

The analysis instruments may have different maximum analysis rates, without affecting the total rate for the analysis of a sample positioned in the circuit, as will be seen below.

The analysis assembly further includes a monitoring unit 6, for example a computer server acting as a scheduler or "dispatcher". The unit 6 can be a LAS-type system for "Laboratory Automation System" dedicated exclusively to sample displacement management and to laboratory automation. The monitoring unit 6 comprises in memory a computer program for the emission of direction change signals, intended for tube holder vehicles circulating on the transport pathways of the circuit 3. Preferably, the monitoring unit 6 includes a communication interface to allow an operator and/or a graphical interface to input control instructions in order to allow the visualization of information on the state of the systems.

In the present example, the monitoring unit 6 is also configured to emit speed monitoring signals to the vehicles circulating on the circuit 3. Thus, the monitoring unit 6 manages the synchronization between the different vehicles of the circuit. One advantage is to strengthen the safety of the operations, possibly by detecting the risks of shock.

In one preferred embodiment, the monitoring unit transmits the speed monitoring signals or any other useful electronic command to the vehicles by a wireless communication pathway, for example via a radiofrequency network such as a Bluetooth, RFID or Wi-Fi network. One advantage of the wireless communication is that it does not risk possible interferences between vehicle monitoring signals and vehicle power supply currents.

As a variant, the monitoring unit 6 is connected to electrical tracks of the circuit 3 via a PLC (Power Line Carrier) module 60, and the monitoring unit 6 transmits direction change signals, speed monitoring signals or any other useful electronic command, to the vehicles present on the circuit 3 by PLC via the electrical tracks of the circuit.

One advantage of this last variant is that it allows the pooling of the communication pathways by PLC and the power supply tracks of the vehicles arranged in the transport pathways.

It should be noted that in the variant where the PLC is used to transmit the vehicle control signals, the supply tracks and the communication pathways with the vehicles may or may not be pooled. In the event that the supply tracks are removed from the communication pathways in the transport pathways, a tube holder vehicle may comprise a first sliding contact dedicated to the supply and a second sliding contact for receiving the commands.

In the example of FIG. 1, all the modules include an electrical track in the vehicle circulation channel. The electrical tracks are placed end to end.

The monitoring unit 6 is configured, optionally, to automatically recognize the scheduling of the modules of the circuit by communication with said modules. Each module can be identified by a unique address.

Advantageously, the analysis assembly comprises a panel 8 for the entry and the exit of sample tubes. The panel 8 comprises a tube storage space and a device (not represented) for the selective displacement of tubes between the storage space and the transport pathway corresponding to the module A4. The entry/exit order of the tubes on the circuit 3 is then monitored. The panel 8 can be replaced by a bulk loading tray.

The systems 5a to 5d, 6 and 8 are here connected to an electronic communication interface 61 between the monitoring unit 6 and a LIS (Laboratory Information System) 7. The interface 61 allows a two-way communication. This is preferably a network hub; the interface 61 is here an Ethernet network switch.

The system LIS 7 comprises databases in which patient data, physiological test results, test program instructions, or any other information useful for laboratory management, are encoded. Preferably, the systems 5a to 5d are configured to communicate with the LIS 7 for the recording of the sample analysis results.

The systems 5a to 5d can also be configured to transmit a sample processing confirmation to the LIS 7. The LIS 7 can then communicate said confirmation to the monitoring unit 6. The state of progress of the analyses is thus taken into account for the scheduling of the tube transport flows.

In general, sample analysis sequences are determined at the LIS 7, which communicates the information on the scheduling of the tube transport flows to the monitoring unit 6.

Tube Holder Vehicle Including a Guide Device

FIG. 3 schematically represents a vehicle 1 circulating along the entry pathway 30 of the circuit 3.

The vehicle 1 is a tube holder vehicle. It comprises a holder, secured to the vehicle, in which a tube can be positioned. The tube can thus be moved by the vehicle without risking a fall of or damage to the tube or its contents. Here, the vehicle 1 comprises a holder 19 which comprises an orifice for the insertion of a tube 9. The tube 9 of FIG. 3 includes a cap 90. It will be understood that if a sample container other than a tube is used, the holder 19 is shaped differently so as to ensure the retention of the container during the displacement of the vehicle.

In accordance with the invention, the vehicle 1 comprises a guide device 2. The device 2 can be configured in a first configuration where it cooperates with a guide path (not represented in FIG. 3) secured to the circuit 3, so as to direct the vehicle towards an exit pathway when the vehicle crosses a fork (not represented), that is to say by an area of the circuit 3 connecting an entry pathway to a plurality of exit pathways that the vehicle 1 may take.

The guide device 2 can further be configured in a second configuration in which it does not cooperate with the guide path, which allows the vehicle to reach another exit pathway after having crossed the fork.

By "guide path" is meant an element extending alongside a transport pathway, able to cooperate with the vehicle to accompany the vehicle in one direction. The cooperation of the device 2 with a guide path produces a sufficiently large mechanical force on the rest of the vehicle to influence the direction of the vehicle. Preferably, the guide path is fixed and has a single configuration; it is the change in the configuration of the guide device that monitors the direction.

A guide path takes for example the form of a rail which extends along the transport pathway.

Via the guide device 2, it is therefore possible to selectively monitor the direction of the vehicle 1 when the vehicle 1 passes through a fork.

Examples of operation of the guide device 2 will be given below in relation to several exemplary embodiments of the vehicle 1 and of the circuit 3.

The vehicle 1 comprises means of locomotion on the transport pathways of the circuit 3. Preferably, the vehicle can move in both directions. The vehicle 1 here includes a frame 10. The frame here has a generally cylindrical shape, the length of the cylinder being small compared to the area of the lower and upper surfaces. The lower and upper surfaces of the frame have, for example, a diameter of between 10 and 50 millimeters, for example 30 millimeters. Thus, the frame 10 has the shape of a puck. Alternatively, the frame could have another shape, for example a parallelepiped shape with a length of preferably 35 millimeters and a width of preferably 25 millimeters.

The vehicle also comprises wheels 12 fixed to a lower face of the frame 10, suitable for creating a driving with the transport pathway 30. The vehicle typically comprises two drive wheels 12.

The vehicle 1 further comprises a control unit 13. The control unit 13 electronically communicates with the guide device 2. The control unit 13 can transmit direction change signals to the guide device 2 to cause a change in the configuration of the guide device 2 between the first and second configurations.

In one advantageous variant, the control unit 13 is able to communicate with the monitoring unit 6 of the analysis assembly, for example by a wireless communication and/or via electrical tracks present on the transport pathway. The control unit 13 can then receive information from the monitoring unit 6 to control the changes of direction.

In this variant, the changes of direction are advantageously managed globally by the monitoring unit 6. It is thus possible to synchronize the movements of all the vehicles circulating on the circuit, in a centralized manner. In addition, it is not necessary to equip the vehicle with a programmed monitoring unit to autonomously determine the changes of direction on the circuit. The vehicle is therefore less expensive to produce than an autonomous tube holder vehicle of the prior art.

Advantageously, the vehicle 1 also comprises a radiofrequency chip 16. The chip 16 is preferably an RFID chip able to cooperate with an RFID reader of the transport pathway.

In one advantageous embodiment, each module of the transport pathway comprises one or more radiofrequency readers. Each reader is configured to detect the presence of a vehicle. The presence of a vehicle is typically detected when the vehicle passes in line with the reader. Preferably, each reader also allows the identification of a vehicle during the determination of its passage. In this variant, the chip 16 is configured to emit, after having been interrogated by a radiofrequency reader, a signal comprising an identifier of the vehicle. The identifier of the vehicle has been previously recorded in a memory of the chip 16. Thus, a radiofrequency reader 35 can activate the chip 16 and transmit an identifier request thereto when the vehicle 1 passes in the vicinity of the reader 35.

The reader 35 is for example located in the transport pathway and can electronically communicate with the unit 6. According to other variants, the chip 16 can be supplemented or replaced by means of communication with the transport pathway. The chip 16 is for example replaced by an optical means such as a bar code or by a QR Code, and the reader 35 is configured to implement optical recognition of the code on the vehicle. As one variant, the means of communication with the transport pathway are mechanical, magnetic, or any other usual means of communication.

The radiofrequency readers associated with the vehicle identification means form an information feedback loop, for the complete and secure monitoring and management of the tube transport flows by the LIS 7. The monitoring unit 6 can thus synchronize in real-time the displacements of the vehicles and minimize the risks of blockages or collisions between vehicles.

One advantage is that it allows the real-time transmission of spatial and temporal information on the circulation of the tube holder vehicles on the circuit 3.

Thanks to the guide device 2, the vehicle 1 constitutes a simple and partially autonomous tube transport means. On a circuit equipped with several vehicles similar to the vehicle 1, a direction monitoring can be implemented at each vehicle. Thus, it is possible to use "passive" transport pathways, that is to say, without integrating movable elements that make the change of direction of the vehicles. In particular, the forks of the transport circuit do not need to incorporate movable elements.

One additional advantage of the vehicle comprising the guide device 2 is that several vehicles can cross the same intersection and take different paths, one independently of the other. This is not the case for a point of an "active" transport pathway of the prior art, which can make only one vehicle direction change at a time, and which furthermore requires the conservation of sufficient space between each vehicle to avoid bad orientations.

Insofar as it is the vehicle that bears the forces for the change of direction, the wear is mainly experienced by the vehicle and by its guide device over time. The transport pathway is "passive" and does not necessarily comprise a movable element. However, on a circuit for transporting samples from an analysis laboratory, there are generally more tube conveyors than forks; thus, a device for guiding a vehicle wears out less quickly than a point which would be located on a fork in the case of an "active" transport pathway.

In addition, in the event of malfunction or failure of a vehicle guide device, the ability of the other vehicles of the circuit to make the changes of direction is not affected. Optionally, the transport pathway comprises a point used only in the event of failure of a vehicle, movable towards an exit configuration. When the point is in the exit configuration, a faulty vehicle can be pushed towards said point by a functional tube holder vehicle, which allows the faulty vehicle to be separated from the transport circuit for maintenance or replacement. Other solutions for evacuating a tube holder vehicle that has broken down are described below in relation to FIGS. 6a to 6c. In the case of an active transport pathway of the prior art, the failure of a movable element of the pathway prevents all the vehicles passing through said pathway from changing direction, which often leads to an overall failure of the system, unless this system has complementary bypass pathways which further complicate the automation and the material costs.

One additional advantage of the vehicle including a guide device for the change of direction is the predictability of the wear of the vehicle. Indeed, the rate of use of the tube holder vehicle is known in real time, since this rate of use depends directly on the number of samples circulated on the circuit.

Vehicle with Mechanical Guide Device on an Upper Face

Figure 4:
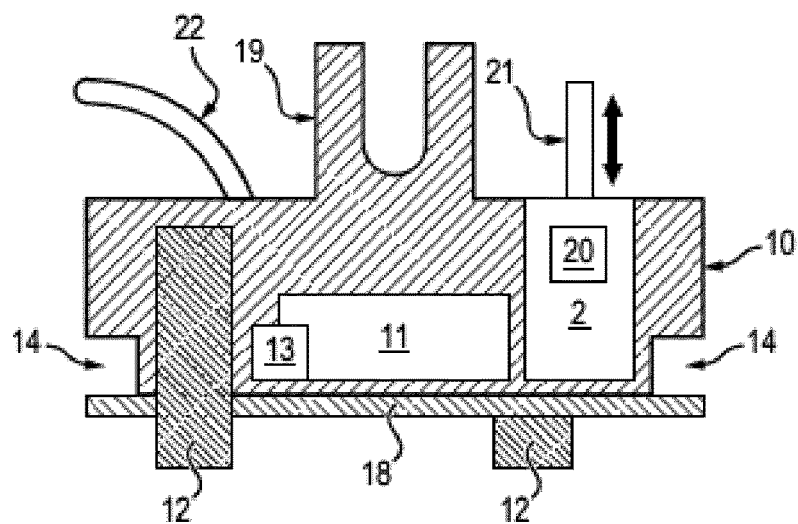
FIG. 4 represents a tube holder vehicle according to a first embodiment.

FIG. 4 represents a first example of a tube holder vehicle in accordance with FIG. 3. The vehicle comprises or does not comprise a radiofrequency chip. The vehicle can circulate on the transport pathway 30.

In FIG. 4, the vehicle is viewed from a rear side.

The vehicle comprises a frame 10 having the overall shape of a puck. Alternatively, the shape of the frame may be parallelepiped. In this example, the frame 10 is molded of plastic material. A tube holder 19 is positioned on an upper surface of the frame, the upper surface being opposite to a lower surface of the frame, the latter surface being intended to face an upper surface of a transport pathway on which the vehicle is running.

The tube holder here comprises a base protruding from the upper surface of the frame, in which a U-shaped orifice intended to receive a lower portion of a tube 9 is made, the tube 9 then being stabilized in the base.

In addition, a mechanical-type guide device 2 able to cooperate with a guide path of a transport pathway, is arranged in the frame.

The guide device 2 here comprises a rod 21 and an actuator 20 adapted to move the rod 21. The actuator 20 is here of the solenoid type. The actuator is electronically controlled and is in electronic communication with the processing unit 13.

The rod 21 has a deployed position and a stowed position. The deployed position of the rod corresponds to the first configuration of the vehicle. The stowed position of the rod corresponds to the second configuration of the vehicle. The actuator 20 is configured to selectively tilt the rod 21 from either one of these two positions.

FIG. 5 represents the vehicle of FIG. 4 positioned on a transport pathway, here the entry pathway 30, still seen from the rear side. The first exit pathway 32a and the second exit pathway 32b may be similar in design to that of the entry pathway 30 illustrated here. FIG. 5 illustrates the deployed position and the stowed position of the rod 21 of the guide device 2.

The transport pathway comprises a holder, for example formed of metal. The holder comprises a face 37, in contact with the wheels 12, on which the vehicle is running. The face 37 of the transport pathway is in contact with the ground or with a base on which the transport pathway is positioned. The holder further comprises two substantially parallel side walls 38, between which the vehicle is running. The side walls 38 extend substantially perpendicularly to the face 37 of the holder, vertically from the face 37. Each of the side walls 38 extends into a medial portion 39 which extends parallel to the face 37. At least one side wall (in the present example, each of the side walls) comprises an edge configured to laterally retain the vehicle when the vehicle guide device cooperates with said edge.

In the present example, the edges cooperating with the guide device comprise shoulders 4a and 4b. The medial portions 39 of the transport pathway extend into terminal portions which comprise the shoulders 4a and 4b. The shoulders thus act as guide paths for the tube holder vehicle. The operation of the guide device in this first example is described below.

Preferably, each terminal portion is also configured to prevent forward or backward tilting of the vehicle along a direction parallel to a direction of advance of the vehicle. One advantage of this configuration of the holder of the transport pathway is to stabilize the vehicle both in its lateral displacement (between left and right according to the orientation of FIG. 5) and in its forward/backward inclination. This thereby improves the stability of the sample inserted in the sample holder. This is particularly relevant in the event that the tube inserted into the holder is not blocked.

In the present example, the shoulders 4a and 4b extend towards an upper side of the frame 10 and form an obtuse angle with the horizontal medial portions 39. The shoulders 4a and 4b are thus oriented inwardly of the vehicle and limit forward/backward tilting of the vehicle.

The right shoulder 4a forms a first guide path 4a for the vehicle, and the left shoulder 4b forms a second guide path for the vehicle. The two shoulders 4a and 4b are substantially symmetrical with respect to a central axis of the pathway 30. A free space is arranged between the tips of the two shoulders 4a and 4b, so as to let the tube 9 protrude out of the holder 19 during the passage of the vehicle in the transport pathway.

Thus, the tube holder vehicle runs along the pathway 30 without being hampered in its stroke by the two shoulders, even when a tube is arranged in the holder 19.

It will be noted that, for the operation of the guide device 2, the left shoulder 4b is not necessary.

The rod 21 in the deployed position 2a protrudes from the upper surface of the vehicle frame so as to point towards an inner surface of the shoulder 4a. If the vehicle encounters a fork and begins to move to the left, the rod 21 abuts against the shoulder 4a. The rod 21 is made of a sufficiently resistant material (for example metal) to withstand the tensile force of the vehicle leaving to the left. By reaction force, the vehicle is held in the vicinity of the shoulder 4a and does not turn to the left. The rod 21 has a sufficient length to come into abutment against the shoulder 4a when the rod is in the deployed position, here a length of between 1 and 10 millimeters.

The rod 21 in the stowed position 2b is retracted inside the frame. Thus, when the guide device 2 is in the second configuration and the rod is stowed, the vehicle is not blocked in its stroke by the shoulder 4a if the latter begins to move to the left.

The actuator 20 therefore acts on the stroke of the rod 21 to move the rod between the deployed position, in which the rod cooperates with the shoulder forming the guide path, and the stowed position, in which the rod does not cooperate with the shoulder forming the guide path.

The frame 10 of the vehicle further contains a processing unit 13 and a motor 11. The motor ensures the motorization of two wheels 12 of the vehicle extending beyond a lower surface 18 of the frame. Advantageously, to increase the tube transport efficiency and the analysis rate, the motor 11 is a high efficiency motor. This is for example a direct current motor or a brushless motor. The motor 11 is able to transform the electrical energy, with which the vehicle is powered, into mechanical energy to turn the wheels 12 forward or backward. The wheels can be replaced by any means of locomotion of the vehicle along a transport pathway. Preferably, the motor is directly supplied with electrical energy by the sliding electrical contacts of the vehicle when these contacts cooperate with supply tracks of the transport pathway.

The processing unit 13 is configured to receive displacement control signals and to convert said signals into monitoring signals for the motor 12. Preferably, the processing unit 13 is also configured to monitor a vehicle displacement speed as a function of speed information encoded in the displacement control signals.

An average speed of the vehicle during its displacement along the circuit is preferably between 0.1 and 1 meter per second, and typically amounts to 0.4 meters per second.

Preferably, the motor 11 is able to drive the wheels 12 either in a forward direction or in a backward direction. Preferably, a speed of the motor can be monitored by the processing unit 13.

It will be noted that the wheels 12 are not necessarily configured to change orientation since the guide device 2 allows vehicle direction changes without the need to pivot the wheels.

Advantageously, the processing unit 13 is here also configured to control the change in the configuration of the guide device 2 from one of the first and second configurations to the other configuration. If there are more than two configurations of the vehicle guide device—in particular in the case where the vehicle can reach three different guide paths or more when crossing a fork in the circuit—the processing unit 13 is preferably configured to control all the corresponding configuration changes.

The processing unit 13 can for example receive the direction change commands from the monitoring unit 6 associated with the circuit 3, either wirelessly or via electrical tracks of the transport pathway.

Preferably, the vehicle 1 comprises, on a surface of the frame, an electrical contact 14. The contact 14 is configured to cooperate with a power supply track of a transport pathway, to supply the vehicle while the latter is on the transport pathway.

In a preferred variant represented in FIGS. 4 and 5, the vehicle comprises two distinct electrical contacts 14 positioned on the two opposite side surfaces of the vehicle, and the contacts 14 are able to cooperate with power supply tracks extending along the side walls of the transport pathway. The contacts 14 are sliding electrical contacts.

The close-up view from the bottom of FIG. 5 represents the interface between the electrical contact 14 located on the left face of the vehicle and the power supply track 34 in the form of a sliding rail, which extends along the left side wall.

The power supply track 34 comprises two electrodes 340 of opposite polarities between which an electric current can flow. The electrical contacts 14 are here placed on a printed circuit (or PCB for Printed Circuit Board) of the vehicle. These are sliding electrical contacts arranged to come into contact with the electrodes 340 during the displacement of the vehicle in the transport pathway 30.

The vehicle is able to receive direction change signals and/or speed change signals from the monitoring unit 6 via a wireless network such as a Wi-Fi network. In one possible variant, the supply track 34 is of the PLC (Power Line Carrier) type. The track 34 is then also able to transfer electronic data to the vehicle processing unit, for example direction change signals.

It should be noted that the vehicle may comprise, as an alternative to or in combination with a Wi-Fi interface, an interface able to receive signals by Bluetooth communication.

Optionally, the vehicle can comprise an autonomous energy reserve, as a replacement for or in combination with the electrical contacts 14. The vehicle is then autonomous with regard to its power supply. This is in particular useful if the vehicle has to cross areas without contact with power supply tracks. The autonomous energy reserve is for example an accumulator or a supercapacitor. It will be understood that the vehicles according to the alternative examples presented below can also include such an autonomous energy reserve.

The vehicle of FIGS. 4 and 5 comprises, according to one preferred embodiment, an elastic guide 22. The function of the elastic guide 22 is to cooperate with the second guide path 4b, opposite to the first guide path 4a on the transport pathway. The connection created between the vehicle and the wall of the pathway 30, when the guide 22 cooperates with the shoulder 4b, is an elastic connection.

The guide 22 can adopt an upper configuration, illustrated in FIGS. 4 and 5, in which the guide 22 is arranged to come into contact with the shoulder 4b. The guide 22 can further adopt a low configuration (for example, retracted into the frame) in which the guide 22 does not cooperate with the shoulder 4b.

When the guide 22 is in contact with the shoulder 4b, the guide exerts a reaction force tending to prevent the vehicle from moving suddenly to the right. However, the guide 22 has an elasticity which authorizes horizontal displacement of the guide up to a certain limit, for example a displacement from one to ten millimeters.

Here, the guide 22 is a spring part, having a lower rigidity than the rod 21 along a horizontal direction.

It will be noted that the alternative examples of tube holder vehicle presented below, including guide devices different from the one described above, may also include a guide similar to the guide 22.

In this preferred embodiment, the pathway 30 comprises the two shoulders 4a and 4b.

In one variant, the tube holder vehicle does not comprise a guide 22. The vehicle can for example comprise a second guide device on the left side, of structure and operation similar to the guide device 2.

Optionally, the vehicle can also comprise a sensor that allows detecting the presence of other vehicles in the vicinity.

One advantage of the embodiment of FIGS. 4 and 5 is that the architecture of the vehicle is very simple. The vehicle is easy to assemble. Additionally, if the vehicle body is molded of plastic material, no welding is required.

Optionally and advantageously, a transport pathway of a sample transport circuit can be configured to allow manual withdrawal of the vehicle in the event of failure of the latter.

Figure 6A:
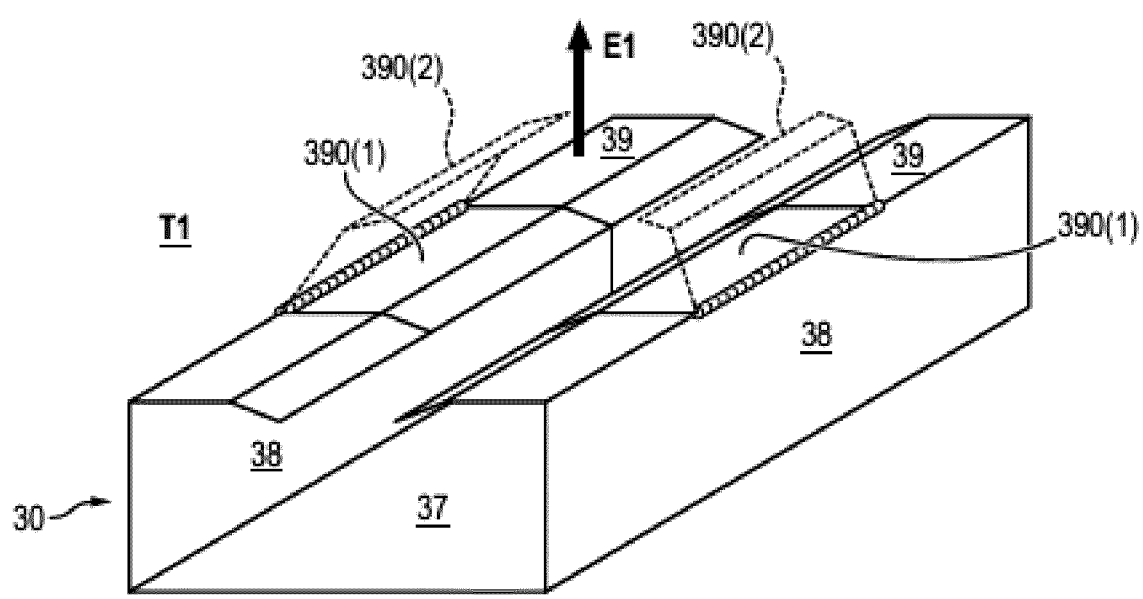
FIGS. 6a, 6b, 6c are schematic perspective views of transport pathways including a lower portion similar to the transport pathway of FIG. 5 and an upper portion respectively according to a first variant, a second variant and a third variant.
Figure 6B:
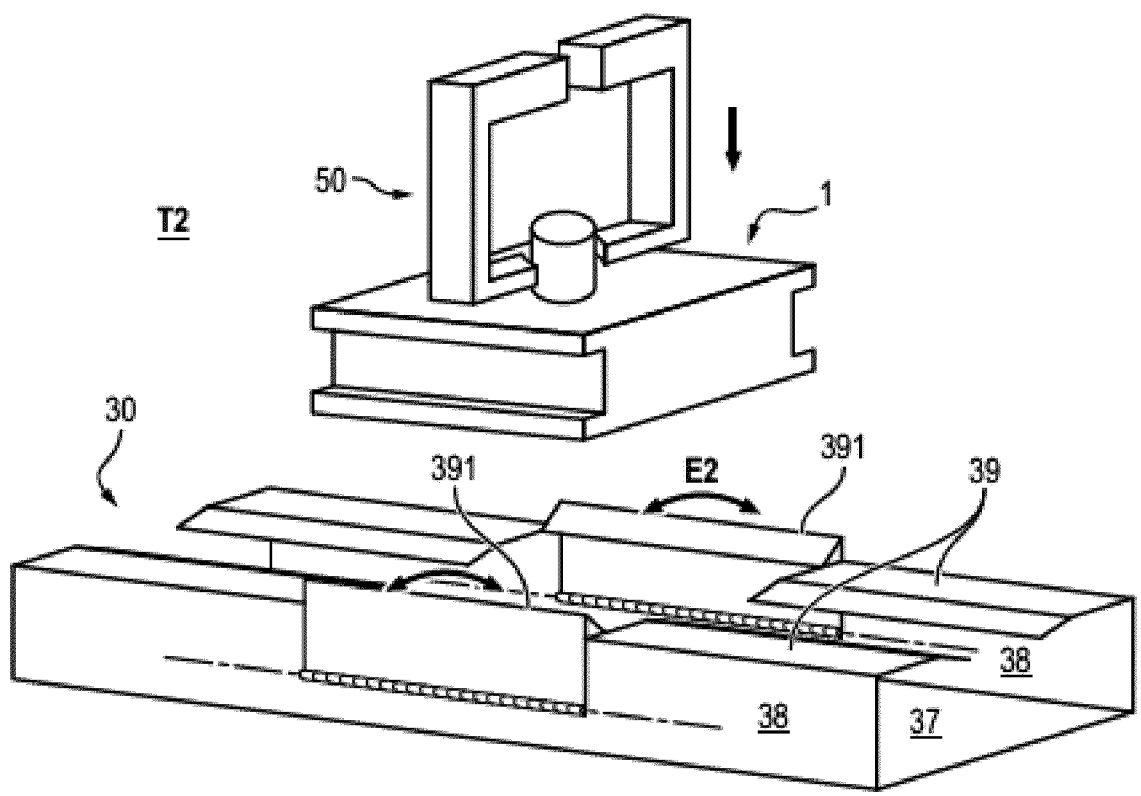
Figure 6C:
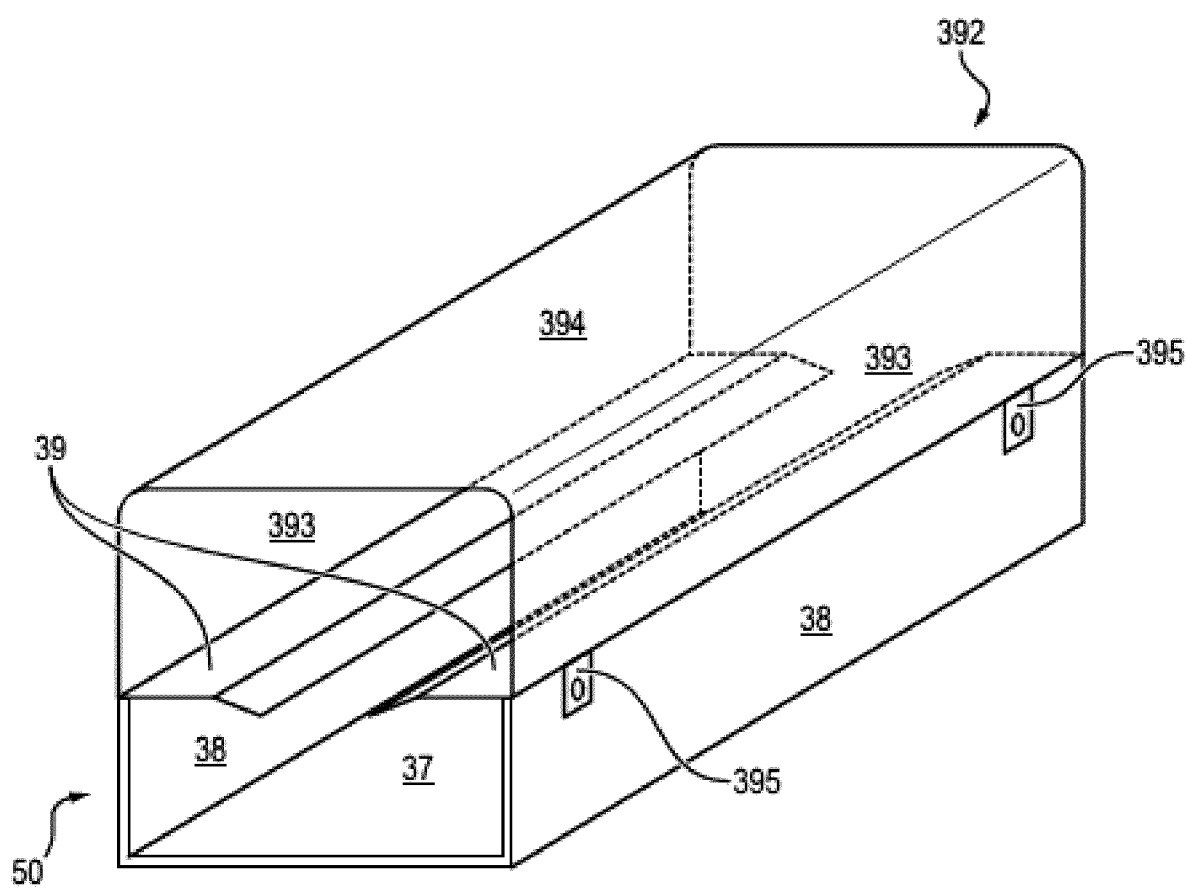

FIGS. 6a to 6c represent several transport pathways comprising shoulders, similar to the transport pathway of FIG. 5, with movable elements to allow a withdrawal of the vehicle. It will be noted that these movable elements can also be implemented on a transport pathway of the type described below in relation to FIGS. 7a and 7b.

FIG. 6a illustrates a transport pathway 30 according to a first variant allowing manual withdrawal of the vehicle. On a longitudinal segment of the pathway, the medial portions 39 are fixed to their respective side walls 38 along a section T1 located in the extension of the upper edges of the side walls. Preferably, the medial portions are fixed on the walls 38 only along the section T1. The medial portions 39 and the terminal portions comprising the shoulders are movable in rotation around the section, between a low position 390 (1) represented in solid lines in FIG. 6a and a upper position 390 (2) represented in dotted lines in the figure.

The position 390 (1) is a vehicle holding position. It is the normal position during operation of the vehicle and of the circuit, corresponding to the position illustrated in FIG. 5. The position 390 (2) is a vehicle release position. In this position, the terminal portions of the transport pathway (here the shoulders 4a and 4b) are configured so as not to hold the vehicle in position when the latter is located between the terminal portions. One advantage is to allow vertical displacement of a vehicle (not represented), for example along the direction E1, to withdraw the vehicle.

FIG. 6b illustrates a second pathway variant allowing a vehicle withdrawal. On a longitudinal segment of the pathway, upper portions of side walls 38, as well as the medial portions 39 and the terminal portions located in the transverse extension of said upper portions, are movable around a section T2 located in the extension of the upper edges of the side walls. Movable segments 391 of the two side walls are thus defined. The segments 391 are located opposite each other and can be separated by a gesture of an operator. The separated position of the segments 391 corresponds to a vehicle release position and the non-separated position corresponds to a vehicle holding position. Also represented in FIG. 6b, a robotic arm 50 and a vehicle 1 extracted from the transport pathway 30, held by the grippers of the robotic arm.

FIG. 6c illustrates a third variant of a pathway allowing a vehicle withdrawal. Here, a cover 392 rests on the side walls 38 of the transport pathway 30. The medial portions 39 and the shoulders forming terminal portions of said medial portions, form a lower surface of the cover 392. The cover also comprises side walls 393 as well as an upper wall 394 extending between the side walls. The cover 392 can be attached to the side walls of the transport pathway by any known fixing means; here, screw fasteners 395 are disposed along the length of the cover.

It will be understood that if the screw fasteners 395 are unscrewed, the cover 392 can be lifted, leaving the space between the side walls 38 uncovered. Thus, if a vehicle is in said space, it can be withdrawn manually or by the robotic arm of FIG. 6b. The cover 392 is thus removable. The position where the cover is in place is a vehicle holding position and the position where the cover is lifted is a vehicle release position.

Preferably, in these three variants, the tilting of the walls of the transport pathway between the vehicle holding position and the vehicle release position is performed manually, by a gesture of an operator. The tilting can also be carried out by a mechanical robotic system and/or controlled remotely by actuators.

It will be noted that the movable or removable elements of the variants of FIGS. 6a to 6c authorizing the withdrawal of the vehicle can be used in combination.

FIG. 7a represents a second example of a tube holder vehicle in accordance with FIG. 3. This vehicle comprises a mechanical guide device including, like the vehicle of the first example, a movable rod between a stowed position and a deployed position to cooperate selectively with an edge of a guide path. The vehicle is also seen from the back. The vehicle has been represented during its displacement in a transport pathway.

The vehicle and the transport pathway according to this second example have a structure generally identical to the vehicle and to the transport pathway of the first example, except with regard to the electrical contact between the vehicle and the transport pathway, and with regard to the structure of the guide path and its cooperation with the vehicle guide device.

In this second example, the transport pathway has the shape of a cradle open on its upper face. The segment of the transport pathway, along a plane perpendicular to the direction of advance of the vehicle, is U-shaped.

The side walls of the transport pathway do not necessarily comprise medial portions extending parallel to the lower face of the transport pathway and to the end of the side walls. Here, the cradle comprises a lower face 37' and two parallel side walls 38' extending from both sides of the lower face. The vehicle is received between the two walls 38' during its displacement on the transport pathway.

As a guide path, the right side wall here comprises a cavity 40 passing through the wall. This cavity, located here approximately at mid-height of the wall, extends along the entry pathway, the fork and the first exit pathway of the transport pathway. The cavity 40 has for example the shape of an oblong hole extending along a longitudinal direction parallel to the lower face of the transport pathway.

In the example of FIGS. 7a and 7b, as in the other vehicle exemplary embodiments shown in the present description, possible dimensions of the vehicle are as follows:
  total height comprised between 50 and 100 millimeters, for example 70 millimeters,
  frame width comprised between 30 and 100 millimeters, for example 60 millimeters,
  length of the frame comprised between 30 and 100 millimeters, for example 70 millimeters.

As in the previous exemplary embodiment, the vehicle preferably comprises two drive wheels 12.

The right side face 101 of the vehicle faces the cavity 40. The guide device comprises a rod 21' provided, at its terminal end, with a rod head 210 fixed to the rod. The rod is dimensioned to be able to pass through the cavity 40 while extending substantially perpendicularly to the surface of the right side wall. The rod is movable between a stowed position represented in FIG. 7a, in which the rod and the rod head remain in the frame 10 of the vehicle, and a deployed position represented in FIG. 7b, in which the rod passes through the cavity.

In the latter position, the rod head 210 is blocked on the left (along the orientation of FIG. 7b) by an edge 4c of the cavity 40, which prevents the vehicle from moving laterally to the left. Indeed, the rod head has a vertical dimension greater than the width of the cavity 40, and the rod in the deployed position is arranged so that the rod head is at a small lateral distance from the right surface of the right side wall of the transport pathway.

Thus, when the rod is in the deployed position of FIG. 7b, the vehicle has a small margin of lateral remoteness relative to the right side wall. The vehicle is forced to take the first exit pathway as it crosses the fork.

To allow the passage of the rod 21' between the stowed and deployed positions, a localized widening of the cavity 40 can be provided in the side wall, allowing the rod head 210 to pass through the side wall.

The guide device is actuated by an electromagnet or by a motor to switch between the stowed and deployed positions of the rod. In this example, the solenoid 20' is electronically monitored to control a change in the position of the rod 21'. A servomotor to control the displacement of the rod and the point of the vehicle can also be used.

Advantageously and optionally, damping wheels (not illustrated in FIGS. 7a and 7b) can be arranged between the side faces of the vehicle frame and the side walls of the transport pathway, for example between the right side face 101 and the facing side wall 38'. Several damping wheels are for example disposed on the right side face 101, including a wheel on the front portion of said face and a wheel on the rear portion of said face. The damping wheels comprise a strip of damping material on the periphery of the wheel.

One advantage is that the friction between the vehicle and the walls of the transport pathway is minimized. The wear of the vehicle frame and of the transport pathway is thus limited, in particular at the forks when the vehicle changes direction.

It will be noted that one or several damping wheels can also be added to vehicles corresponding to the other exemplary embodiments of the present description.

As an alternative to the configuration represented in FIGS. 7a and 7b, a transport pathway may include both a cavity similar to the cavity 40 on a left side wall and a cavity on a right side wall. If the rod 21' is movable between a left protrusion position, a middle position and a right protrusion position, for example if the rod 21' is controlled by a servomotor, then it is possible to control the engagement of the rod with the left cavity or with the right cavity. The vehicle can then be controlled to be selectively engaged on one pathway among three exit pathways (left pathway, central pathway, right pathway) after crossing a fork.

The vehicle according to the example represented in FIGS. 7a and 7b comprises, on the side flanks of the frame 10, movable sliding contacts 14'. These sliding contacts are laid, during the displacement of the vehicle along the transport pathway, on power supply tracks 24' which run alongside walls 38'.

In the present example, the power supply tracks 34' are located at the upper ends of the two side walls 38'. The positive electric pole of the vehicle comprises the movable sliding contacts 14' and the negative electric pole comprises the running plane. The movable sliding contacts 14' hang from the side flanks of the vehicle, and are laid from above on the tracks 34'.

Preferably, the movable sliding contacts 14' are formed from a material which allows minimizing friction with the supply tracks 34', in order to limit the wear of said contacts.

The advantage of using electrical contacts laid from above on the transport pathway is that it does not prevent a displacement of the vehicle upwards.

Thus, in the event of failure of the vehicle, the vehicle can be manually or automatically pulled upwards to free the transport pathway. It is for example possible to use a robotic arm like the one illustrated in FIG. 6b to extract the vehicle.

As an option, the guide cradle materializing the transport pathway can be conductive and constitute an electric pole. For example, the cradle can be electrified to form a negative electric pole. For that, the entire cradle can be formed of a metal material. One advantage of this option is that it allows the use of a single conductive element in the supply track: to supply the vehicle, an electrical contact of the vehicle is placed directly in contact with the transport pathway and another electrical contact of the vehicle is brought into contact with said conductive element.

It will be noted that the option of a transport pathway including conductive elements forming an electric pole can also be implemented with lateral sliding electrical contacts.

As an alternative to or in combination of the movable sliding contacts 14' cooperating with the tracks 34', the vehicle may comprise sliding contacts 14 similar to those of the vehicle illustrated in FIGS. 4 and 5, cooperating with the sliding rails 34.

The vehicle may also comprise a guide similar to the guide 22 of FIGS. 4 and 5, to prevent sudden displacement of the vehicle during its change of direction.

Sequence of Displacement of the Mechanically Guided Vehicle

FIG. 8 is a top view of an area of the circuit 3, in which several successive positions P1 to P4 of the vehicle have been recorded according to the embodiment of FIGS. 4 and 5 during its displacement along the circuit 3. It will be noted that the circuit 3 is also adapted for use with the vehicle of the second embodiment described in relation to FIGS. 7a and 7b. The remainder of the circuit 3 is not represented, which preferably forms a closed loop.

The area of the circuit 3 illustrated in FIG. 8 comprises the entry pathway 30 opening out at its right end on the fork 31, the fork itself opening out at its right ends on a first exit pathway 32a and a second exit pathway 32b.

The fork allows the vehicle circulating on the entry pathway to be redirected to the first exit pathway or to the second exit pathway.

FIG. 8 represents a sequence of displacement of the vehicle during which the vehicle takes the fork 31, then is directed towards the first exit pathway 32a by the action of the guide device 2.

The shoulder 4a forms a guide path which extends alongside the pathway 30, the low portion of the fork 31 and the first exit pathway 32a. The shoulder 4b extends alongside the pathway 30, the upper portion of the fork 31 and the second exit pathway 32b. The shoulders 4a and 4b are secured to their respective transport pathways.

A first power supply track 34a (in accordance with the description above) which extends opposite the shoulder 4a and a second power supply track 34b which extends opposite the shoulder 4b is also represented.

Preferably, the transport pathways 30, 32a and 32b are of identical width d (except at the fork) so that the vehicle is adapted to circulate on the three pathways without the risk of pivoting.

The displacement sequence represented in FIG. 8 is as follows:

Before reaching the position P1, the vehicle circulates on the pathway 30, the rod 21 is in the stowed position and does not cooperate with the shoulder 4a, the guide 22 is in contact with the shoulder 4b.

At position P1, the vehicle is still circulating on the pathway 30 and the rod 21 is tilted into the deployed position. The vehicle is therefore secured to the shoulder 4a. Preferably, the tilting of the rod 21 in the deployed position results from the reception by the processing unit 13 of a directional signal.

At position P2, the vehicle circulates on the fork 31. The rod 21 remains in the deployed position. The guide 22, which cooperated with the shoulder 4b between the positions P1 and P2 by allowing an unhooking of the vehicle for a distance x downwards, is now lowered. The vehicle then becomes free to pivot to make its change of direction.

At position P3, the vehicle begins its stroke on the exit pathway 32a. The guide 22, which was lowered, is tilted in the upper position, so that the vehicle is again guided by the cooperation of the guide 22 with another shoulder which faces the shoulder 4a on the exit pathway 32a. The rod 21 is still in the deployed position.

At position P4, the vehicle continues its stroke on the exit pathway 32a and the rod 21 is tilted into the stowed position. The guide device 2 and the guide 22 are therefore in similar configurations relative to the start state before the position P1.

Thus, the guide device 2 allows forcing the vehicle to make the change of direction and the elastic guide 22 allows accompanying the change of direction.

Typically, the first exit pathway 32a is located in the vicinity of an automated diagnosis machine such as any one of the instruments 5a to 5d. The first exit pathway 2a then corresponds to a simulation ramp to direct the tube transport vehicle towards the automated diagnosis machine.

With its integrated guide device, the vehicle crossing the fork can either take the first pathway 32a for the biological sample contained in the tube to be analyzed, or take the second pathway 32b to cross without analysis. One advantage is that the arrival of empty tubes, or tubes not intended for analysis by the automated diagnosis machine located in the area, does not slow down the rate of the automated diagnosis machine.

Thus, an optimization of the instrument analysis rates is possible, even when different types of tests are carried out, if necessary on the same biological sample. It is common practice to perform, after a first test, additional tests of the Rerun type (a new iteration of the initial test, to specify or verify a measurement result in the event of a suspected error) or of the Reflex type (secondary tests performed only on a subset of tubes).

Very advantageously, the transport pathways of the circuit 3 comprise at least one vehicle detector configured to rapidly detect the passage of a vehicle. Said detector is preferably also configured to identify the vehicle or is associated with another detector suitable for ensuring this identification. The detectors are typically placed below the upper surface of a transportation pathway. According to one example, the vehicle detectors are radiofrequency transceivers configured to communicate with a radiofrequency chip of the vehicle, such as a chip RFID.

In this example, the entry pathway 30 comprises a first sensor A allowing detection of the vehicle before the transmission of a directional signal to the vehicle. The fork 31 comprises a second sensor B that allows detecting whether the area immediately upstream of the junction between the two exit pathways 32a and 32b is free, or whether said area is occupied by a vehicle. One advantage is to avoid collisions between tube holder vehicles.

The sensors A and B are preferably passage detectors by optical beam cut-off. The sensors can thus detect with great reactivity a passage of the vehicle through their detection area.

The circuit may comprise other passage detectors by optical beam cut-off.

Vehicle with Mechanical Guide Device on a Lower Face

FIGS. 9a, 9b and 9c represent three distinct configurations of a tube holder vehicle in accordance with the diagram of FIG. 3, according to a third exemplary embodiment, which can circulate on the transport pathway 30. This vehicle is adapted to operate with a circuit having a fork leading to three distinct exit pathways. In FIGS. 9a to 9c, the vehicle 1 is viewed from the back, the vehicle being located on the fork and heading towards one of the exit pathways.

In this third exemplary embodiment, the guide device comprises a low abutment element 26 which can protrude from a lower face 18 of the vehicle frame. The low abutment element 26 has a shape complementary to the shape of a groove in the transport pathway. The groove is recessed into the surface 37 of the transport pathway on which the vehicle is located. Here, the abutment element 26 has a substantially triangular shape and the groove also has a triangular shape. The groove of the transport pathway forms a guide path capable of laterally blocking the abutment element, forcing the vehicle to remain in the vicinity of the groove. The vehicle, when crossing the fork, is forced to orient towards the exit pathway along which the groove extends.

The low abutment element 26 therefore constitutes an index which can be switched by notching (in particular under the monitoring of the processing unit, which is not represented) in order to be positioned selectively on one of the three guide paths corresponding to the three exit pathways. The low abutment element 26 is fixed to a controllable return means in order to retract the abutment element, such as a spring.

FIG. 9a illustrates a first configuration corresponding to an engagement of the low abutment element 26 in a groove 42a which extends along the fork 31 and the first exit pathway 32a of the circuit. The vehicle runs against a left side wall of the transport pathway.

FIG. 9b illustrates a second configuration corresponding to an engagement of the low abutment element 26 in a groove 42b which extends along the fork 31 and the second exit pathway 32b of the circuit. The vehicle runs against a right side wall of the transport pathway.

FIG. 9c illustrates a third configuration corresponding to an engagement of the low abutment element 26 in a groove 42c which extends along the fork 31 and the third exit pathway 32c of the circuit. This configuration corresponds to a central position of the vehicle 1, between the two positions of FIGS. 9a and 9b. It is noted that in this third example, the lateral distance between the side walls of the vehicle frame (when it is in the third configuration) and the side walls is sufficient to allow a displacement of the vehicle towards the left or towards the right.

In the event that the vehicle is powered via supply tracks located along the transport pathway, the electrical contacts 14 are preferably arranged so that at least one pair of contacts 14 is in contact with one supply track in any configuration.

Thus, in the present example, the vehicle comprises a pair of contacts on a left side and a pair of contacts on a right side, cooperating with electrodes 340 of the supply tracks 34 on the left and on the right respectively. In addition, the supply tracks 34 extend over a width sufficient for the left and right pairs of electrical contacts 14 to touch the neighboring electrodes 340 when the vehicle 1 is in the central position illustrated in FIG. 9c.

As an alternative or in combination, the supply tracks can be placed on the grooves made in the surface 37. The low abutment element 26 then comprises electrical contacts.

Still alternatively or in combination, the vehicle 1 can comprise an autonomous energy reserve, preferably one or several accumulator(s) or supercapacitor(s). One advantage is to ensure that a reliable power supply remains available for the vehicle 1 regardless of the configuration, and in particular when the vehicle is in the central position illustrated in FIG. 9c.

FIG. 10 illustrates a vehicle 1 in accordance with the example of FIGS. 9a to 9c and a transport circuit adapted to operate with said vehicle. The vehicle 1 here runs on an entry pathway 30, the low abutment element 26 being engaged in a groove 42c. The entry pathway opens out on a fork 31. A plane P passing through the fork 31 has been represented, this plane corresponding to the position of the vehicle 1 in FIGS. 9a to 9c. The fork opens out on three exit pathways comprising a central pathway 32c and two, respectively left and right, side pathways 32a and 32b. The side pathways constitute deviations relative to the central pathway.

A second fork 31' is also represented, the exit pathways 32a, 32b and 32c meeting at their right end on the fork 31'. The second fork 31' opens out at its right end on another transport pathway 30'.

A groove is made along each of the exit pathways in order to direct the vehicle in its displacement, regardless of the direction adopted by the vehicle.

In this example of circuit, an analysis instrument 5a, for example an automated diagnosis machine, is positioned in the vicinity of the left exit pathway. Thus, when the vehicle is directed towards the left exit pathway, a tube transported by the vehicle can be subjected to an analysis by the analysis instrument 5a. Conversely, the vehicle can travel along the path between the forks 31 and 31' passing through the central pathway, if it is not necessary for the transported tube to be subjected to the analysis by the instrument 5*a*.

Likewise, another analysis instrument (not represented here) can be disposed in the vicinity of the right exit pathway.

Vehicle with Magnetic Guide Device

FIG. 11 represents a fourth example of a tube holder vehicle in accordance with FIG. 3. The vehicle comprises or does not comprise a radiofrequency chip. The vehicle can circulate on the transport pathway 30.

On this diagram, the vehicle is seen from below, from the side of the transport pathway.

The vehicle comprises functional elements similar to those of the vehicle of FIGS. 4 and 5 for the motorization, the command, the handling of the tube, the power supply, etc. For the sake of brevity, all of these elements are not listed here.

However, the guide device does not operate according to the principle explained in relation to FIGS. 4 and 5. In the present example, the guide device is magnetic.

The guide device indeed comprises here a magnet 23 made of magnetic material. The magnet 23 is preferably a permanent magnet, or alternatively an electromagnet. The magnet 23 is movable between a first location, where it is intended to cooperate with a magnetic path of the transport pathway, and a second location, where it is intended not to cooperate sufficiently with said magnetic path.

The magnetic paths are for example strips of magnetic material extending along the transport pathways, forming guide paths.

Typically, the magnet 23 and the magnetic path of the transport pathway have opposite polarities so that the magnetic path attracts the magnet 23 when the magnet 23 is at a sufficiently small distance from the magnetic path.

Preferably, the magnet 23 is movable between a central position (illustrated in FIG. 11) corresponding to the second location, and an end position (shifted upwards or downwards relative to the position of FIG. 11) where the magnet 23 enters the field of action of the magnetic path.

In the variant illustrated here, two magnetic paths of the transport pathways are placed on the sides of the transport pathways, so that the magnet in a central position is not attracted towards one position or another, and so that the magnet can adopt two end positions to selectively cooperate with a magnetic path to make a change in direction of the vehicle.

Alternatively, the magnet can only be set in the two ends positions and then forms a bistable system.

In FIG. 11 and according to one possible arrangement, the magnet 23 is fixed to an arm 24 pivotally mounted on the frame 10 of the tube holder vehicle. The frame here comprises on its lower surface an arm holder part 25, secured to the frame. A first end of the arm 24 is mounted on the part 25 and the magnet 23 is fixed to a second end of the arm. The arm is electronically controlled, for example by the vehicle processing unit, to move between the first location and the second location of the magnet 23 (and possibly other locations) and thus make the changes of direction at the forks.

The vehicle further preferably comprises a sensor 17 that allows detecting the presence of other vehicles in the vicinity.

The sensor 17 is here an optical sensor configured to detect a visual pattern, such as a bar code or a QR Code, from another vehicle (typically a tube holder vehicle) located in the vicinity. However, other detection modes can be envisaged. As an alternative or in combination, the vehicle may include an accelerometer for detecting sudden displacements of the vehicle or collisions with other vehicles, or any other known means for detecting obstacles.

It will be noted that the vehicle can further comprise an elastic guide similar to the guide 22 described above, forming an elastic connection with a guide path of the transport pathway. However, the transport pathway must then comprise a mechanical element (such as a shoulder in FIG. 5) able to cooperate with such an elastic guide.

FIG. 12 is a top view of a transport circuit 3' of the same general structure as the transport circuit 3 of FIG. 8, except that the circuit no longer necessarily comprises mechanical guide paths in the form of shoulders. The circuit 3' comprises, as guide paths, magnetic paths 43*a* and 43*b*.

The magnetic path 43*a* extends alongside the fork 31 and the first exit pathway 32*a*, the latter being in the vicinity of an analysis position of an automated diagnosis machine 5*a*.

The magnetic path 43*b* extends alongside the fork 31 and the second exit pathway 32*b*. The second exit pathway 32*b* allows the vehicle to cross without going through the automated diagnosis machine, thus without slowing down the analysis of other tubes.

A second fork 31' is also represented, the exit pathways 32*a* and 32*b* meeting at their right end on the fork 31'. The second fork 31' opens out at its right end on another transport pathway 30'.

As for Example 1, the guide paths are secured to their respective transport pathways.

In this example, the guide device comprising the magnet 23 can cooperate with the magnetic path 43*a* so as to selectively direct the vehicle towards the exit pathway 32*a*, and the magnet can also cooperate with the magnetic path 43*b* so as to direct selectively the vehicle towards the exit pathway 32*b*.

The magnet is here controlled to selectively adopt:
  a central position 2*c* in which it is not biased by any of the magnetic paths,
  a upper end position 2*a* in which it is biased by the magnetic path 43*a*,
  a lower end position 2*b* in which it is biased by the magnetic path 43*b*.

Preferably, the magnet is mechanically biased towards the central position. Thus, in the absence of bias by a magnetic path, the magnet adopts the central position. When the vehicle reaches the junction of two pathways, the magnet is preferably repositioned in the central position.

The magnetic paths 43*a* and 43*b* are sufficiently apart so that the magnet in the central position 2*c* is not sufficiently attracted by any one of them to drive the tube holder vehicle in one direction or another.

Thus, if the vehicle running on the entry pathway 30 receives a direction change signal before reaching the level of the fork 31, the guide device adopts the corresponding position and the vehicle is oriented to take either of the exit pathways 32*a* and 32*b*.

In the event that the vehicle crosses the fork 31 and continues its stroke in the first exit pathway 32*a*, the vehicle is directed towards the system 5*a*. Afterwards, the vehicle is mechanically redirected at the fork 31' towards the pathway 30'. The guide device does not necessarily intervene to direct the vehicle towards the pathway 30'.

In the event that the vehicle crosses the fork 31 and continues its stroke in the second exit pathway 32*b*, the vehicle moves straight ahead, then is mechanically redirected at the fork 31' towards the pathway 30', without being necessarily directed by the guide device.

If the vehicle comprises an elastic guide, the elastic guide can be controlled in a manner similar to the displacement sequence of FIG. 8 in order to guide the movement.

One advantage of a vehicle including a magnetic guide device, for example a device in accordance with the example of FIGS. 11 and 12, is the possibility of avoiding direct contact between the guide device and the guide path, which reduces their wear. In addition, the structure of the transport pathways is not very complex since a simple ferrous metal strip can serve as a guide path and cooperate with the magnet of the guide device.

The invention claimed is:

1. A vehicle for transporting a biological sample, the vehicle comprising a guide device comprising a movable magnet, wherein the guide device is configured to operate selectively in a first configuration and in a second configuration wherein in the first configuration the guide device is configured to direct the vehicle towards a first exit pathway of a circuit by cooperating with a first guide path of the circuit extending alongside an entry pathway of the circuit, a fork of the circuit and the first exit pathway of the circuit when the vehicle crosses the fork, and wherein in the second configuration the guide device is configured to enable the vehicle to move towards a second exit pathway of the circuit, the second exit pathway different from the first exit pathway, by not cooperating with the first guide path when the vehicle crosses the fork wherein the movable magnet is configured to selectively move from a first position to a second position and from the second position to the first position wherein in the first position, the movable magnet is configured to attract the vehicle towards the first guide path by cooperating with the first guide path and wherein in the second position the movable magnet is configured to not attract the vehicle towards the first guide path by not cooperating with the first guide path.

2. The vehicle according to claim 1 wherein the guide device is further configured to direct the vehicle towards the second exit pathway, by cooperating with a second guide path of the circuit extending alongside the entry pathway, the fork and the second exit pathway when the vehicle, in the second configuration, crosses the fork.

3. The vehicle according to claim 1 wherein the guide device comprises a rod and a solenoid adapted to move the rod, wherein first guide path has an edge and the rod is arranged to retain the vehicle in proximity to the first guide path by abutting against the edge of the first guide path when the guide device is in the first configuration.

4. The vehicle according to claim 1 further including a lower face, and wherein the guide device comprises a movable abutment element configured to move towards a position in which the movable abutment element protrudes from the lower face, wherein the first guide path includes a groove and the movable abutment element is configured to retain the vehicle in proximity to the first guide path by engaging in the groove of the first guide path when the guide device is in the first configuration.

5. The vehicle according to claim 1 further comprising a frame, wherein the guide device comprises an arm pivotally mounted on the frame, and the magnet is fixed to the arm.

6. The vehicle according to claim 1 further comprising:
   wheels; and
   a motor configured to drive the wheels to selectively rotate forward or backward, wherein the motor is a direct current DC motor or a brushless motor or both.

7. The vehicle according to claim 1 further comprising a guide for forming an elastic connection between the vehicle and a second guide path of a circuit extending alongside the entry pathway, the fork and a second exit pathway of the circuit.

8. The vehicle according to claim 1 further comprising a control unit configured to change the guide device selectively from the first configuration to the second configuration and from the second configuration to the first configuration.

9. The vehicle according to claim 1 further comprising at least one sliding electrical contact adapted to supply electric current to the vehicle, wherein the sliding electrical contact is arranged to continuously contact the circuit as the vehicle circulates on the circuit.

10. The vehicle according to claim 1 further comprising an autonomous energy reserve.

11. The vehicle according to claim 1 further comprising a vehicle sensor configured to detect a second vehicle in proximity to the vehicle.

12. The vehicle according to claim 1 further comprising a radiofrequency chip configured to emit a vehicle identifying signal.

13. A sample transport assembly comprising:
    the vehicle according to claim 1, and
    the circuit wherein the fork forms a first intersection between the entry pathway, the first exit pathway and the second exit pathway.

14. The sample transport assembly according to claim 13 wherein the vehicle comprises wheels and wherein at least one of the entry pathway and the first exit pathway comprises a lower surface for contacting the wheels and further comprises a first side wall and a second wall parallel the second side wall, and the first side wall and the second side wall extending from the lower surface, and the first guide path arranged along one of the first side wall and the second side wall.

15. The sample transport assembly according to claim 14 wherein the first side wall and the second side wall comprise a first movable shoulder and a second movable shoulder, respectively wherein the first moveable shoulder and the second movable shoulder are configured to selectively operate in a holding position and in a releasing position and are configured to hold the vehicle in the holding position when the vehicle is located between the first movable shoulder and the second movable shoulder, and are configured to enable the vehicle, in the releasing position, to move out of the circuit when the vehicle is located between the first movable shoulder and the second movable shoulder.

16. The sample transport assembly according to claim 13 wherein the vehicle further comprises at least one sliding electrical contact adapted to supply electric current to the vehicle, and wherein the circuit comprises a supply track arranged to cooperate with the at least one sliding electrical contact.

17. The sample transport assembly according to claim 13 wherein the circuit further comprises at least one vehicle passage detector for detecting a passage of the vehicle.

18. The sample transport assembly according to claim 13 wherein the circuit further comprises a third exit pathway extending between the first exit pathway and the second exit pathway, the fork forming second intersection between the entry pathway, the first exit pathway, the second first exit pathway and the third exit pathway.

19. A sample analysis assembly comprising:
    the sample transport assembly according to claim 13, wherein the vehicle further comprises:
    a sample container;

a sample analysis unit having an analysis area and arranged relative to the circuit so that the vehicle has access, as the vehicle circulates on the circuit, to an access position in which the sample container is located in the analysis area of the sample analysis unit;

a control unit; and a monitoring unit configured to emit a direction change signal intended for the control unit of the vehicle.

20. The sample analysis assembly according to claim 19 wherein the sample analysis unit is located in of in proximity to the first guide path, so that the vehicle, when crossing the fork, is directed towards the sample analysis unit when the guide device is in the first configuration.

21. The sample transport assembly according to claim 17 wherein the at least one passage detector is configured to receive a vehicle identifier.

22. The sample transport assembly according to claim 17 wherein the vehicle further comprises a radiofrequency chip and the sample transport assembly further comprises at least one passage detector comprising a radiofrequency transceiver configured to activate the radiofrequency chip of the vehicle.

* * * * *